(12) United States Patent
Kakimoto

(10) Patent No.: US 7,313,612 B1
(45) Date of Patent: Dec. 25, 2007

(54) INFORMATION MANAGEMENT METHOD IN NETWORK SYSTEM

(75) Inventor: Atsushi Kakimoto, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 444 days.

(21) Appl. No.: 09/678,893

(22) Filed: Oct. 4, 2000

(30) Foreign Application Priority Data

Oct. 4, 1999 (JP) ................................. 11-283096
Oct. 4, 1999 (JP) ................................. 11-283097
Oct. 3, 2000 (JP) ............................. 2000-303114

(51) Int. Cl.
*G06F 15/173* (2006.01)
(52) U.S. Cl. ....................... 709/223; 709/224; 709/226; 709/229
(58) Field of Classification Search ................. 709/200, 709/220–229, 21; 358/1.15, 1.9
See application file for complete search history.

(56) References Cited

U.S. PATENT DOCUMENTS

| 5,720,013 | A | * | 2/1998 | Uda et al. ................... 358/1.15 |
| 5,832,298 | A | * | 11/1998 | Sanchez et al. ................. 710/8 |
| 5,845,076 | A | * | 12/1998 | Arakawa ................ 395/200.33 |
| 5,862,404 | A | * | 1/1999 | Onaga ........................ 395/828 |
| 5,911,044 | A | * | 6/1999 | Lo et al. ...................... 709/203 |
| 5,996,003 | A | * | 11/1999 | Namikata et al. ........... 709/205 |
| 6,154,787 | A | * | 11/2000 | Urevig et al. .................. 710/8 |
| 6,321,258 | B1 | * | 11/2001 | Stollfus et al. ............. 709/220 |
| 6,327,613 | B1 | * | 12/2001 | Goshey et al. .............. 709/208 |
| 6,466,973 | B2 | * | 10/2002 | Jaffe .......................... 709/223 |
| 6,473,783 | B2 | * | 10/2002 | Goshey et al. .............. 709/203 |
| 6,484,217 | B1 | * | 11/2002 | Fuente et al. ................. 710/15 |
| 6,754,695 | B2 | * | 6/2004 | Kuroshima ................. 709/210 |

FOREIGN PATENT DOCUMENTS

| JP | 62211762 A | * | 9/1987 |
| JP | 07021470 A | * | 12/1995 |
| JP | 9-172435 | | 3/1997 |

* cited by examiner

*Primary Examiner*—Ario Etienne
*Assistant Examiner*—LaShonda Jacobs
(74) *Attorney, Agent, or Firm*—Fitzpatrick, Cella, Harper & Scinto

(57) ABSTRACT

A terminal apparatus is capable of efficiently managing the status of shared device(s) on the network in a unified manner, constantly, with the latest status information, thereby permitting a user easily to understand the status of the desired shared device. For each of the terminal apparatuses on the network, there are provided server and client. These function in the same manner regardless of whether the information exchange is with another apparatus or within one apparatus. The server means acquires and provides the information of the shared device, required from the client of another apparatus or the same apparatus.

27 Claims, 18 Drawing Sheets

FIG. 5

| NO. OF ITEMS | 201 |
| --- | --- |
| NETWORK ADDRESS OF OWN HOST | 202 |
| LOGON USER | 203 |
| SECURITY MANAGEMENT | 204 |
| SERVER EXPANSION FUNCTION | 205 |
| RESOURCE OF OWN HOST | 206 |
| CLIENT EXPANSION FUNCTION | 207 |
| LICENSE | 208 |
| OTHERS | 209 |

FIG. 6

| | | |
|---|---|---|
| NO. OF ITEMS | | 211 |
| RESOURCE TYPE | | 212 |
| OTHERS | | 213 |
| INFO ON RESOURCE $R_1$ (214$_1$) | RESOURCE NAME | 215 |
| | NETWORK NAME | 216 |
| | SECURITY | 217 |
| | DRIVER | 218 |
| | COLOR | 219 |
| | EXPANSION FUNCTION | 220 |
| | STATUS | 221 |
| | OTHERS | 222 |
| ⋮ | | |
| INFO ON RESOURCE $R_N$ | | 214$_N$ |

*FIG. 8*

| | | |
|---|---|---|
| 240 HEADER | ID | 241 |
| | VERSION | 242 |
| | ATTRIBUTE | 243 |
| | OFFSET | 244 |
| | OTHERS | 245 |
| 250 TRANSMISSION DATA | NETWORK INFO ON RECEIVER HOST | 251 |
| | ID OF SERVER EXPANSION MODULE | 252 |
| | FUNCTION REQUESTED | 253 |
| | SECURITY | 254 |
| | DATA | 255 |
| | OTHERS | 256 |
| 260 SENDER DATA | NETWORK INFO ON SENDER HOST | 261 |
| | LOGON USER | 262 |
| | TIME OUT | 263 |
| | OTHERS | 264 |

INFORMATION MANAGEMENT METHOD IN NETWORK SYSTEM

BACKGROUND OF THE INVENTION

1. Field of the Invention

The present invention relates to management technology for a network device, particularly a network input/output device such as a printer, a scanner or a facsimile locally connected to an information processing apparatus such as a computer or the like.

2. Related Background Art

For example in a network system in which plural terminal or host apparatus such as a personal computer (hereinafter also represented as PC) are so connected as to be capable of mutual communication, there is known a system allowing to use various devices (hereinafter also called resources) for example a printer, an image input device such as a scanner or a disk driver locally connected to a terminal apparatus from other terminal apparatus through the network.

In such conventional network system, however, it has not been possible to manage the resources (commonly shared devices) usable by other terminal apparatus through the network and to efficiently check the status of each resource. More specifically it has not been possible to confirm the status of a commonly shared device desired on the network by designating such device. Also it has not been possible to automatically acquire the latest status information of the commonly shared device on the network.

SUMMARY OF THE INVENTION

In consideration of the foregoing, the object of the present invention is to provide an information processing apparatus which manages a first shared device, including: (1) selection means for selecting a second shared device managed by another information processing apparatus; (2) determination means for determining which information processing apparatus manages the second shared device selected by the selection means; (3) reception means for receiving information of the second shared device selected by the selection means from the other information processing apparatus determined by said determination means, the received information including information of the second shared device comprising an updated status and a connected condition; (4) recognition means for recognizing whether at least one of the first and second shared devices has been updated regarding its status, in accordance with the information received by the reception means; (5) renewal means for updating the information on the status or a connected condition of the second shared device in accordance with a recognition result made by the recognition means; and (6) display means for displaying the information on the status or the connected condition of the first shared device and the second shared device updated by the renewal means and the information of the first shared device on a same screen of the display means, wherein the displayed information on the first shared device is updated and the information on a third shared device which is managed by the information processing apparatus but not selected by the selection means is not updated.

Another aspect of the present invention provides an information processing apparatus which manages a first shared device including: (1) selection means for selecting a second shared device managed by another information processing apparatus; (2) determination means for determining which information processing apparatus manages the second shared device selected by the selection means; (3) obtaining means for obtaining information on a status or a connected condition of the second shared device selected by the selection means from the other information processing apparatus determined by said determination means; (4) recognition means for recognizing whether at least one of the first and second devices has been updated regarding its status or connected condition, in accordance with the information obtained by the obtaining means; and (5) display means for displaying, on a display of the information processing apparatus, the information on the status or the connected condition of the second shared device, in accordance with a recognition result made by the recognition means, and information on a status or a connected condition of the first shared device, wherein the displayed information on the first shared device is updated and the information on a third shared device which is managed by the information processing apparatus but not selected by the selection means is not updated.

Yet another aspect of the present invention provides an information processing apparatus that manages a first device, including: (1) designation means for designating a second device managed by another information processing apparatus; (2) determination means for determining which information processing apparatus manages the second device designated by the designation means; (3) obtaining means for obtaining first device information on the first device from the first device, and second device information on the second device designated by the designation means from the other information processing apparatus determined by said determining means; and (4) display means for displaying a status or a connected condition of the first and second devices based on the first device information and the second device information obtained by the obtaining means wherein the displayed information on the first device is updated and the information on a third device which is managed by the information processing apparatus but not designated by the designation means is not update, and a method and memory therefor.

Yet a further aspect of the present invention provides an information processing apparatus which manages first and second devices, including: (1) selection means for selecting a third device managed by another information processing apparatus; (2) determination means for determining which information processing apparatus manages the third device selected by the selection means; (3) reception means for receiving information of the third device selected by the selection means from the other information processing apparatus determined by the determination means; and (4) display means for displaying the information of the third device received by the reception means and information of the first and second devices managed by the information processing apparatus such that the information of the second device and the information of the first device is displayed in different conditions, and a method and memory therefor.

BRIEF DESCRIPTION OF THE DRAWINGS

FIG. 5 is a view showing local management information of the above-mentioned host terminal apparatus;

FIG. 6 is a view showing resource information of the above-mentioned local management information;

FIG. 8 is a view showing data structure used in communication between the host terminal apparatus;

DETAILED DESCRIPTION OF THE PREFERRED EMBODIMENTS

Now the present invention will be clarified in detail by preferred embodiments thereof, with reference to the accompanying drawings.

First Embodiment

Figure 1:
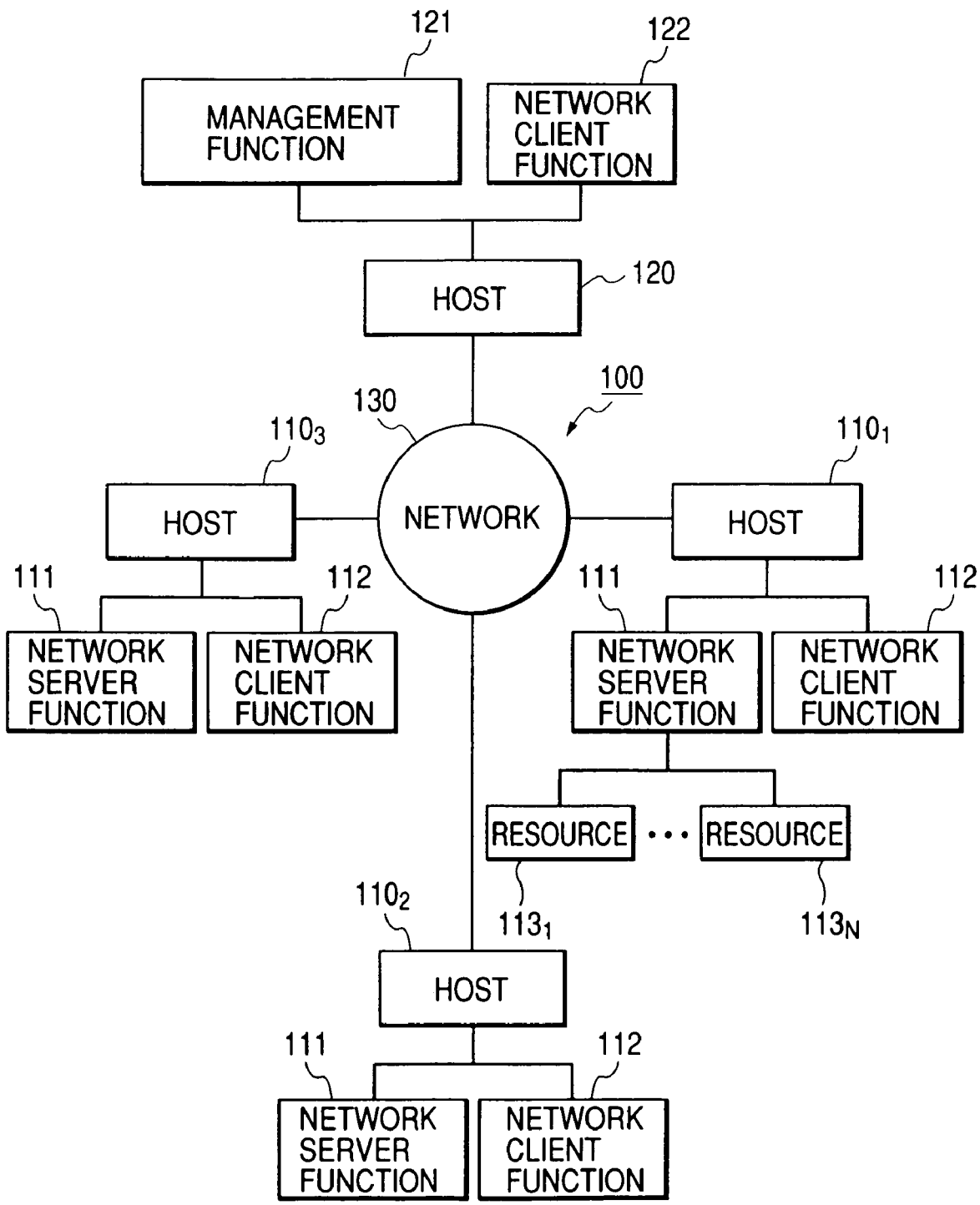
FIG. 1 is a block diagram showing the configuration of a network system embodying the present invention.

The present invention is applicable for example to a network system 100 as shown in FIG. 1. The network system 100 is composed, as shown in FIG. 1, of plural terminal apparatus (host apparatus) $110_1$, $110_2$, $110_3$, 120 which are so connected as to be capable of mutual communication through the network 130. The number of the host terminal apparatus is not limited to four but can be arbitrarily selected.

The host terminal apparatus $110_1$, $110_2$, $110_3$ are constructed similarly, and each apparatus is provided with a network server function 111 and a network client function 112. With the network server function 111 there are connected various resources $113_1$ to $113_N$ such as a printer, an image input device, a disk drive etc. The resource means a device connected locally to the host terminal apparatus.

The host terminal apparatus 120 is provided with a management (administration) function 121 in the network 130 and a network client function 122. The management function 121 is provided with a function similar to the network server function 111 and a management function for each host terminal apparatus, and the network client function 122 is similar to the network client function 112. It is to be noted that the host terminal apparatus 120 having the management function 121 is not essential but may be constructed similar to the host terminal apparatus $110_1$, $110_2$, $110_3$.

In the network system 100 of the present embodiment, as explained in the foregoing, each of the host terminal apparatus $110_1$, $110_2$, $110_3$ is provided with both of the network server function 111 (server module) and the network client function 112 (client module), and these functions are exhibited similarly regardless whether these functions are present in different host terminal apparatus on the network 130 or in a same host terminal apparatus. In the following there will be given a detailed explanation on the network system 100 of the present embodiment.

[Internal Configuration of the Host Terminal Apparatus $110_1$, $110_2$, $110_3$, 120]

The host terminal apparatus $110_1$, $110_2$, $110_3$, 120 are constructed with a similar internal configuration. In the following, for the purpose of simplicity, there will be explained the configuration of the host terminal apparatus $110_1$ as a representative example, and the other host terminal apparatus $110_2$, $110_3$, 120 will not be explained further as they are similar in the configuration to the host terminal apparatus 110.

Figure 2:
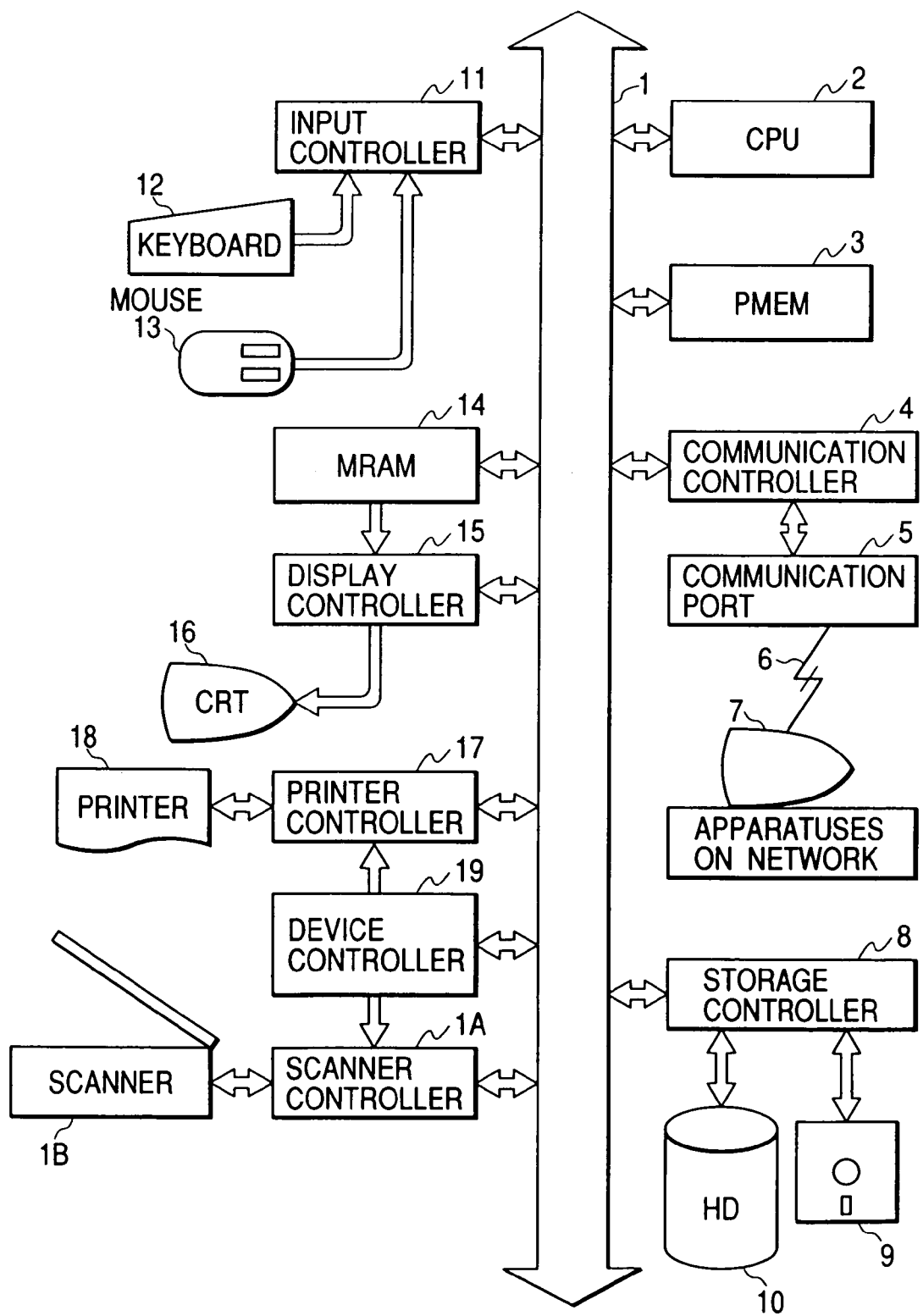
FIG. 2 is a block diagram showing the configuration of a host terminal apparatus on the network system.

The host terminal apparatus $110_1$ is capable of disclosing the information of the device (resource) locally connected thereto, and is provided, for example as shown in FIG. 2, with a CPU (central processing unit) 2 for controlling the functions of the entire apparatus, a program memory (PMEM) 3 for storing various programs and data for the operation control in the CPU 2, a communication control unit 4 for controlling the communication with other apparatus on the network 130, an external memory control unit 8 for controlling the data memory function in a floppy disk (FD) 9 or a hard disk (HD) 10 constituting a memory medium for data files, an input control unit 11 for controlling the input operation from a keyboard 12 or a mouse 13 constituting an operation unit, a video image memory (VRAM) 14 for storing display data for a CRT 16 constituting a display device, a display output control unit 15 for controlling the display operation of the CRT 16, a printer control unit 17 for controlling the printout operation of a printer 18, an image input device control unit 1A for controlling the image input operation of an image input device 1B, and an external device control unit 19 for controlling the printer control unit 17 and the image input device control unit 1A, wherein these components are so connected as to be capable of mutual data exchange through a system bus 1.

The PMEM 3 stores control programs for executing various operations including those featuring the present embodiment as will be explained later. More specifically, such control programs are stored in advance in the HD 10, and the CPU 2 suitably selects and reads such programs from the HD 10, develops them on the PMEM 3 and executes them. Thus there can be realized various operations featuring the present embodiment.

The PMEM 3 also functions as a text memory. Consequently the PMEM 3 stores for example data entered from the keyboard 12 in the form of code information.

The communication control unit 4 controls the input/output data in a communication port 5. Thus the data outputted from the communication port 5 are transmitted, through a communication line 6, to the communication of another apparatus on the network 130.

The communication control unit 4 also executes control for the data exchange with a shared device (printer or image input device) on the network 130.

In the foregoing, the network communication with other apparatus on the network 130 is executed by the communication control unit 4, communication port 5 and communication line 6, but such configuration is not restrictive and the present invention is naturally applicable to the communication through a public line.

The input control unit 11 transmits the operation information (system operation command etc.) entered by the user through the keyboard 12 and the mouse 13 to the CPU 2.

The mouse 13 is an operation unit constituting a pointing device (PD) for instructing editing etc. of image information on the CRT 16. By means of the mouse 13, the user can instruct a desired process for example by moving a cursor in the X and Y directions on the image displayed on the CRT 16 and selecting a command icon on a command menu, and also can designate an image to be edited or a position for image drawing.

In the VRAM 14, data to be displayed on the CRT 16 by the control of the display output control unit 15 are developed as bit map data.

The external device control unit 19 controls the printer control unit 17 and the image input device control unit 1A according to the instruction from another apparatus on the network 130. Therefore, the printer 18 and the image input device 1B function according to the instruction from another apparatus mentioned above.

[Module Configuration of Network Server Function 111 and Network Client Function 112]

As explained in the foregoing, each of the host terminal apparatus $110_1$, $110_2$, $110_3$, 120 is provided with the network server function 111 and the network client function 112 (cf. FIG. 1). Also the network server function 111 and the network client function 112 are so constructed as to function in the same manner regardless whether they are present in different host terminal apparatus on the network 130 or in a same host terminal apparatus.

Figure 3:
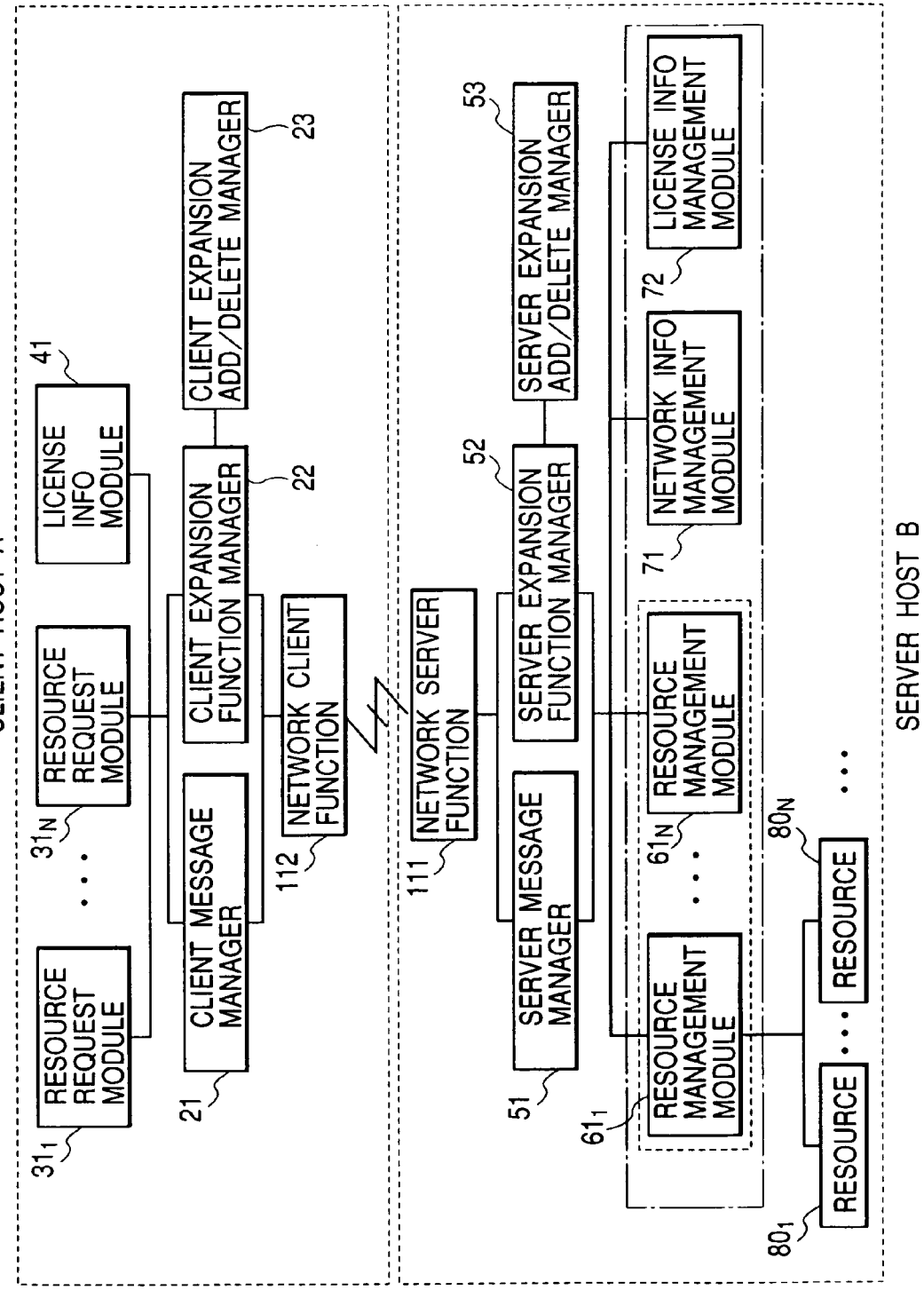
FIG. 3 is a view showing the module configuration, in the above-mentioned network system, between the server function of a host terminal apparatus serving as a server side and the client function of a host terminal apparatus serving as a client side.

FIG. 3 shows the relationship between the modules constituting the network server function 111 and the network client function 112 in case the network client function 112 of an arbitrary one of the host terminal apparatus $110_1$, $110_2$, $110_3$, 120 (host terminal apparatus at the client side, hereinafter called "client side host terminal apparatus A") uses the shared device connected to a host terminal apparatus B through the network 130, utilizing the network server function 111 of another host terminal apparatus (host terminal apparatus at the server side, hereinafter called "server side host terminal apparatus B").

The network client function 112 is a function for exchanging desired data with other apparatus through the network 130, and is composed, as shown in FIG. 3, of a module group including a client message manager 21, a client expansion function manager 22, a client expansion function addition/deletion management module 23, resource request modules $31_1$ to $31_N$, and a license information confirmation module 41.

The resource request modules $31_1$ to $31_N$ are used for acquiring information of resources (shared devices) $R_1$ to $R_N$ set commonly on the network 130 and using such resources by the own host apparatus (client side host terminal apparatus A).

The license confirmation module 41 executes information exchange, before the own host apparatus (client side host apparatus A) executes logging on to a management server (host terminal apparatus 120 shown in FIG. 1, hereinafter called "management server 120") in order to utilize various services on the network 130, for confirming whether there is a right for such logging.

The resource request modules $31_1$ to $31_N$ and the license confirmation module 41 are client expansion function modules and can add an arbitrary function to the own host apparatus (client side host apparatus A) by providing a defined interface to the client expansion manager 22.

The client expansion function addition/deletion module 23 regulates the resource request modules $31_1$ to $31_N$ in case a resource to be used by the own host apparatus (client side host apparatus A) is increased or decreased. Also the client expansion function addition/deletion module 23 manages addition or deletion of the individual client expansion function modules $31_1$ to $31_N$, 41 in cooperation with the client expansion function manager 22.

The client message manager 21 executes a process of transmitting a request message, generated by the client expansion function modules $31_1$ to $31_N$, 41, to the network 130 (either transmission to a specified host terminal apparatus or broadcasting to the entire network 130). Also the client message manager 21 receives a message from another host terminal apparatus, judges whether or not to process the message, and, in case the message is identified to be processed, asks a process for such message to an appropriate one of the client expansion function modulates $31_1$ to $31_N$, 41.

The client expansion manager 22 receives information obtained by the network client function 112, and asks, through a general interface, a process corresponding to such information to the client expansion function modules $31_1$ to $31_N$, 41.

On the other hand, the network server function 111 is a function for receiving request information from a desired client on the network 130 (client side host terminal apparatus A in this case), and is composed, as shown in FIG. 3, of a module group including a server message manager 51, a server expansion function manager 52, a server expansion function addition/deletion management module 53, and resource management modules $61_1$ to $61_N$. In FIG. 3, an entire network information management module 71 and a license information management module 72 will be explained later.

The resource management modules $61_1$ to $61_N$ are modules (server expansion modules) for acquiring information of the plural resources locally connected to the own host apparatus (server side host terminal apparatus B) and controlling these resources for rendering them usable. For example, the resource management module 61 acquires information of the locally connected plural resources $80_1$ to $80_N$ and controls these resources thereby rendering them usable.

The server message manager 51 executes a process of transmitting an information message, generated by the resource management modules $61_1$ to $61_N$ (server expansion modules) to the network 130 (either transmission to a specified host terminal apparatus or broadcasting to the entire network 130). Also the server message manager 51 receives a message from another host terminal apparatus, judges whether or not to process the message, and, in case the message is identified to be processed, asks a process for such message to an appropriate one of the resource management modules $61_1$ to $61_N$ (server expansion module).

The server expansion manager 52 receives information obtained by the network server function 111, and asks, through a general interface, a process corresponding to such information to the resource management modules $61_1$ to $61_N$ (server expansion module).

The server expansion function addition/deletion module 53 executes addition or deletion of the resource management modules $61_1$ to $61_1$N (server expansion function modules) in cooperation with the server expansion function manager 52.

The entire network information management module 71 and the license management module 72 shown in FIG. 3 are modules (server expansion functions) present only in the management server 120 (host terminal apparatus having the management function). More specifically, the management server 120 has a configuration similar to the host terminal apparatus $110_1$, $110_2$, $110_3$ (having the network server function 111 and the network client function 112), but is additionally provided with the entire network information management module 71 and the license management module 72.

The entire network information management module 71 is used for managing the shared device information (information of all the shared devices connected to the respective host terminal apparatus) of all the host terminal apparatus logging on to the management server 120.

The license management module 72 executes information exchange, in case a host terminal apparatus having the network client function 112 executes logging on to the management server 120 in order to utilize various services on the network 130, for confirming whether such logging is entitled.

Figure 4:
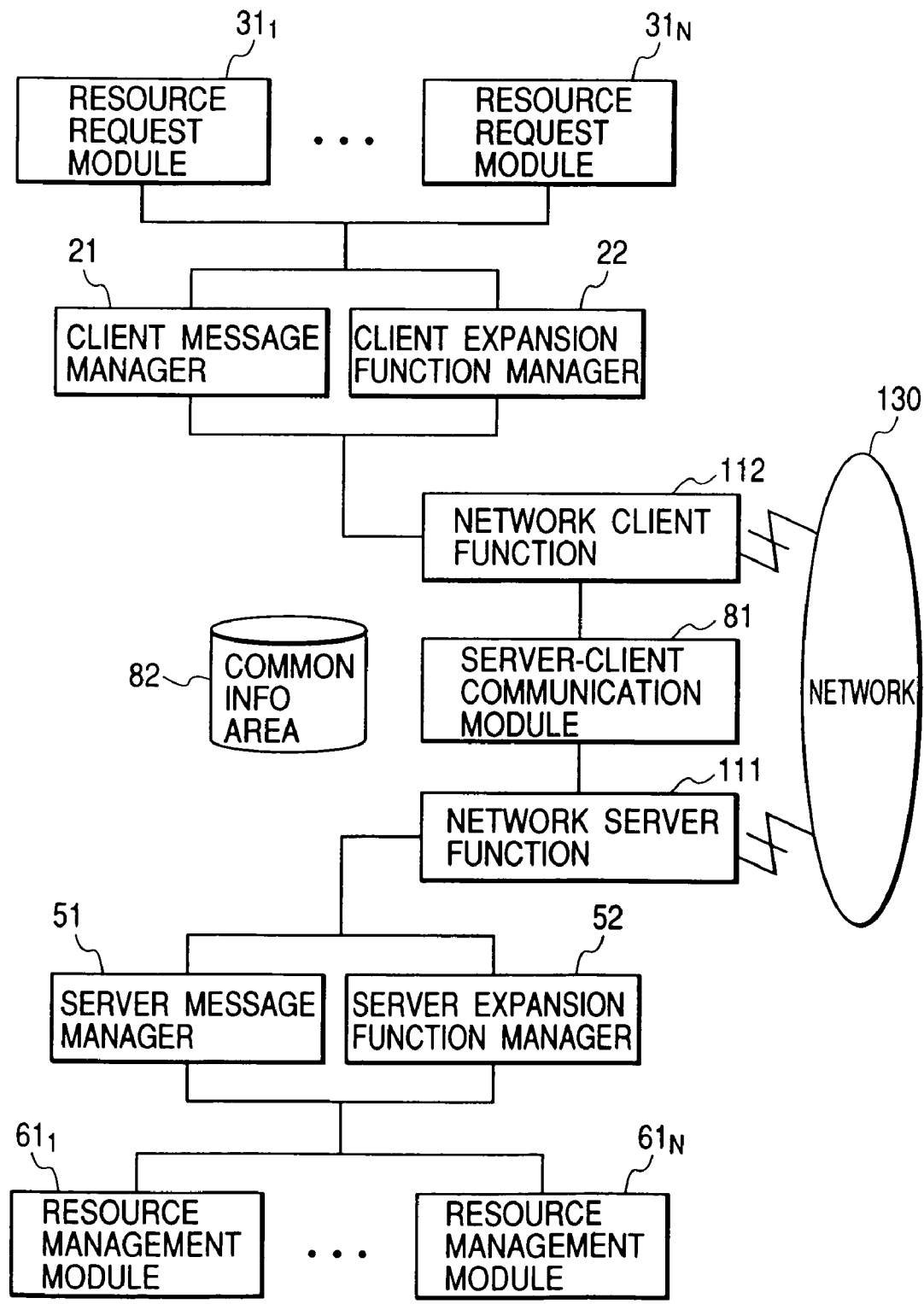
FIG. 4 is a view showing the module configuration of the above-mentioned server function and client function within a same host terminal apparatus.

FIG. 4 shows the relationship among the modules constituting the network server function 112 and the network client function 111 within a same host terminal apparatus.

As shown in FIG. 4, the network client function 112 and the network server function 111 are so constructed as to be capable of mutual communication through a server/client communication module 81. Based on the presence of the server/client communication module 81 between the network server function 111 and the network client function 112, each module constituting these functions can execute process on the data, without differentiating the data exchange with a module in another host terminal apparatus through the network 130 and the data exchange with a module in the same host terminal apparatus (module within the same local host).

The server/client communication module 81 is also provided with a data area 82 for storing information to be shared between the network server function 111 and the network client function 112 within the same host terminal apparatus. In the data area 82, there are set the information, acquired by the network server function 111, of the resource locally connected to the own host apparatus and the information on other host terminal apparatus. Thus, for example the resource request modules $31_1$ to $31_N$ constituting the client expansion modules of the network client function 112 can efficiently refer to the resource information in the data area 82, and can provide a request to the desired resource.

[Configuration of Local Management Information of Host Terminal Apparatus]

FIG. 5 shows the configuration of the local management information of the host terminal apparatus $110_1$, $110_2$, $110_3$, 120. The local management information includes information of the own host apparatus and information on the resource managed by the own host apparatus, and is stored in the aforementioned data area 82 shown in FIG. 4. Based on such local management information, the host terminal apparatus $110_1$, $110_2$, $110_3$, 120 generate response data to a request for the information on the own host apparatus, from another host terminal apparatus or from the management server 120.

More specifically, the local management information includes information 201 to 209 as shown in FIG. 5. The information 201 is the number of information items (management information items) constituting the local management information. The information 202 is the network address of the own host apparatus. Other host terminal apparatus issue an access request based on the address information 202. The information 203 is identification information of the currently logged-on user (log-on) user information. The information 204 is security management information, including information for managing the access right to the individual shared device connected to the own terminal apparatus. The information 205 is on the server expansion function (resource management modules $61_1$ to $61_N$) of the own host apparatus, including information on the server expansion function owned by the own terminal apparatus. The information 206 is resource management information (resource information) under the management of the own terminal apparatus. The details of the resource information 206 will be explained later. The information 207 is on the client expansion function (resource request modules $31_1$ to $31_N$) of the own terminal apparatus, including information on the client expansion function owned by the own terminal apparatus. The information 208 is license information issued in case a log-on request is issued to the terminal apparatus having the management function (management server 120) and is accepted (permitted) by the management server 120. The license information 208 is used in the response in case of a request from the management server 120. The information 209 is other management information of the own terminal apparatus.

The aforementioned resource information 206 is managed for each kind of resources, such as printers or scanners. More specifically, as shown in FIG. 6, the resource information 206 for a kind of resources includes information 211 to 222. The information 211 is the number of items of the information managed in the resource information 206. The information 212 indicates the kind of the resources ("printer", "scanner" etc.) managed in the resource information 206. The information 213 is other management information in the resource information 206.

The information $214_1$ to $214_N$ are information on the individual resources, having similar structures. For example the information $214_1$ relates to a resource $R_1$, including information 215 to 222.

The information 215 is the name of the resource $R_1$. The information 216 indicates a shared name in case the resource $R_1$ is set as shared on the network 130 (in case the resource $R_1$ is connected as a shared device). The information 217 is shared security information in case the resource $R_1$ is set as shared on the network 130. Based on the security information 217, there is determined to whom the resource $R_1$ is to be made available. The information 218 is driver information for driving the resource $R_1$. The information 219 is on the color ability of the resource $R_1$. For example, it indicates whether the resource $R_1$ is a color printer. The information 220 is expansion information of the resource $R_1$. For example, if the resource $R_1$ is a scanner to which an auto feeder is connected or is a printer to which a stacker is connected, the information 220 indicates the expansion function (auto feeder function, stacker function etc.) for the resource $R_1$. The information 221 is status information of the resource $R_1$, including information on power on/off status, number of jobs in process, error state of the resource $R_1$ etc. The information 222 is other resource information of the resource $R_1$.

If the object resource $R_x$ is not set as shared, the network shared name information 216 becomes NULL ("00"). In such case, the information of the resource $R_x$ is not disclosed to other host terminal apparatus.

[Configuration of the Entire Shared Device Management Information in the Network 130]

Figure 7:
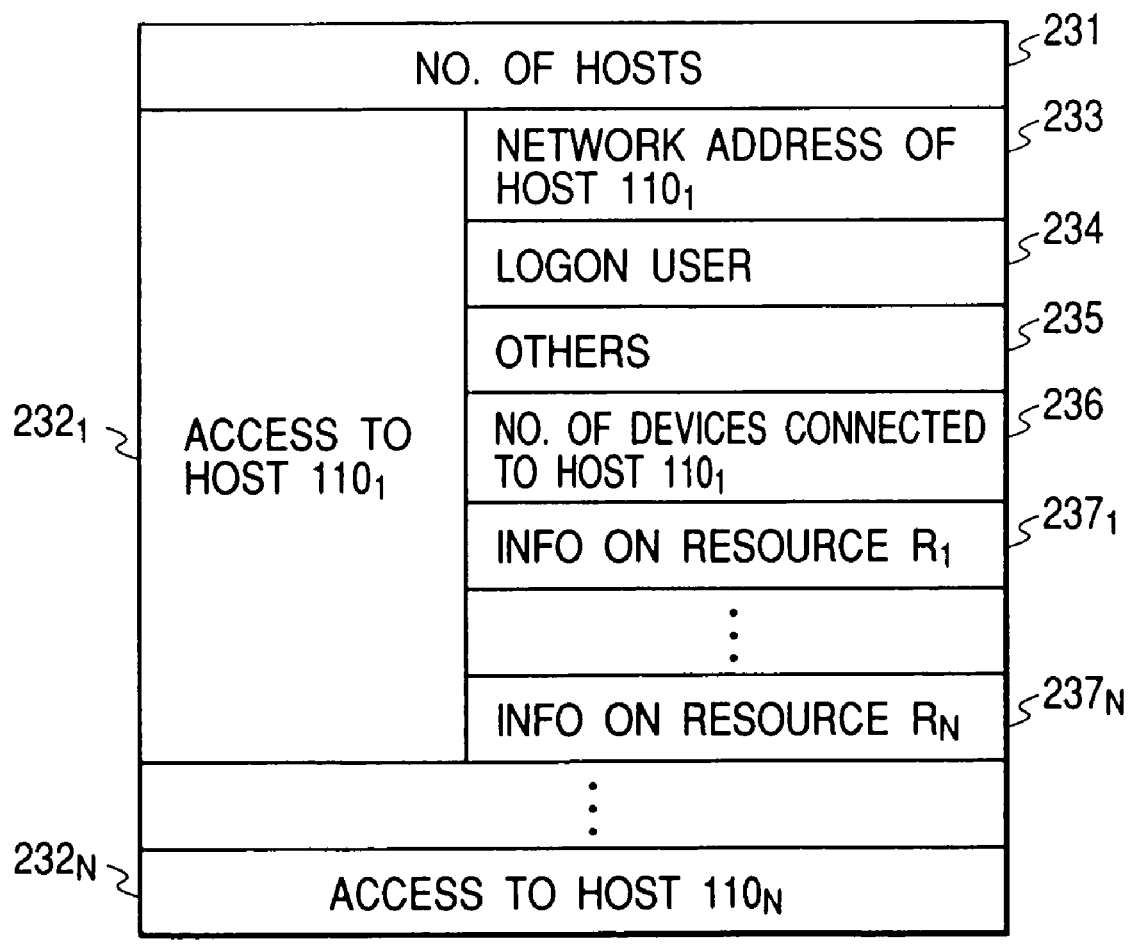
FIG. 7 is a view showing management information of all the shared devices in the network system.

FIG. 7 shows an example of the configuration of the information (the entire shared device management information) for managing the resource information 206 etc. of the local management information, shown in FIG. 5, in all the host terminal apparatus.

The shared device management information is used for managing the shared devices owned by each host terminal apparatus in the network 130, and is held by a host terminal apparatus having the entire network information management module 71 (management server 120 in the present case) if such host terminal apparatus is present in the network 130. Thus, each host terminal apparatus can acquire, whenever necessary, the information on another host terminal apparatus from the shared device management information held by the above-mentioned host terminal apparatus (management server 120). In case the host terminal apparatus having the entire network information management module 71 (management server 120 in the present case) is absent in the network 130, the shared resource management information is collected and stored in each host terminal apparatus.

The entire shared device management information mentioned above includes, as shown in FIG. 7, information 231 on the number of the host terminal apparatus recognized in the network 130 and corresponding to such host terminal apparatus. The access information $232_1$ to $232_N$ are constructed similarly, and, for example, the access information $232_1$ for the host terminal apparatus $110_1$ includes information 233 to $237_N$.

The information 233 is address information of the host terminal apparatus $110_1$ on the network 130. Based on such address information, other host terminal apparatus executes exchange of necessary information. The information 234 is user information currently logged on the host terminal apparatus $110_1$. The information 235 is other identification information of the host terminal apparatus $110_1$. The identification information 235 includes information indicating the kind of the host terminal apparatus $110_1$ and information on the operating system employed in the host terminal apparatus $110_1$. The information 236 is the number of shared devices connected to the host terminal apparatus $110_1$ (under the management thereof). The information $237_1$ to $237_N$ are individual information (shared device management information) corresponding to the shared devices $R_1$ to $R_N$ indicated by the information 236. For example, the information $237_1$ is the management information of a shared device $R_1$. Consequently, based on the information $237_1$ to $237_N$, other host terminal apparatus issue an access request to the desired shared device.

[Configuration of Data Exchanged Between Host Terminal Apparatus]

FIG. 8 shows an example, in case an arbitrary one (client side host terminal apparatus) of the host terminal apparatus $110_1$, $110_2$, $110_3$, 120 utilizes a shared resource connected to another host terminal apparatus (server side host terminal apparatus) through the network 130, of the configuration of the data exchanged between the client side host terminal apparatus and the server side host terminal apparatus. As shown in FIG. 8, the data include header information 240 containing information 241 to 245, real transmission data 250 containing information 251 to 256, and sender data 260 containing information 261 to 264.

In the header information 240, the information 241 is used for identifying the present data at the receiving side. The information 242 is version information of the present data. The information 243 is attribute information of the present data. The attribute information includes information indicating the kind of the present data, such as enquiry, response, information or request. The information 244 is offset information of the real transmission data 250. More specifically, it is head address information of the information 252 of the real transmission data 250. The information 245 is other management information of the present data.

In the real transmission data 250, the information 251 is network information of an addressee terminal (server side host terminal apparatus) having the network server function 111. The information 252 is for identifying any of the server expansion modules $61_1$ to $61_N$ wishing to issue a request (cf. FIG. 4). The information 253 indicates a function actually requested to the server expansion module indicated by the information 252. The information 254 is security information such as a password required in requesting access to the server side host terminal apparatus. The information 255 is the actual data, such as a parameter, transferred to the server expansion module indicated by the information 252. The information 256 is other management information for managing various information in the real transmission data 250.

In the sender data 260, the information 261 is network information indicating the sender host terminal apparatus of the present data. The information 262 is user information currently logged on the sender host terminal apparatus of the present data. The information 263 is timeout setting information indicating the time of disconnection for the present data request. The information 264 is other management information for managing the various information in the sender data 260.

[Display Image of Host Terminal Apparatus]

Figure 9:
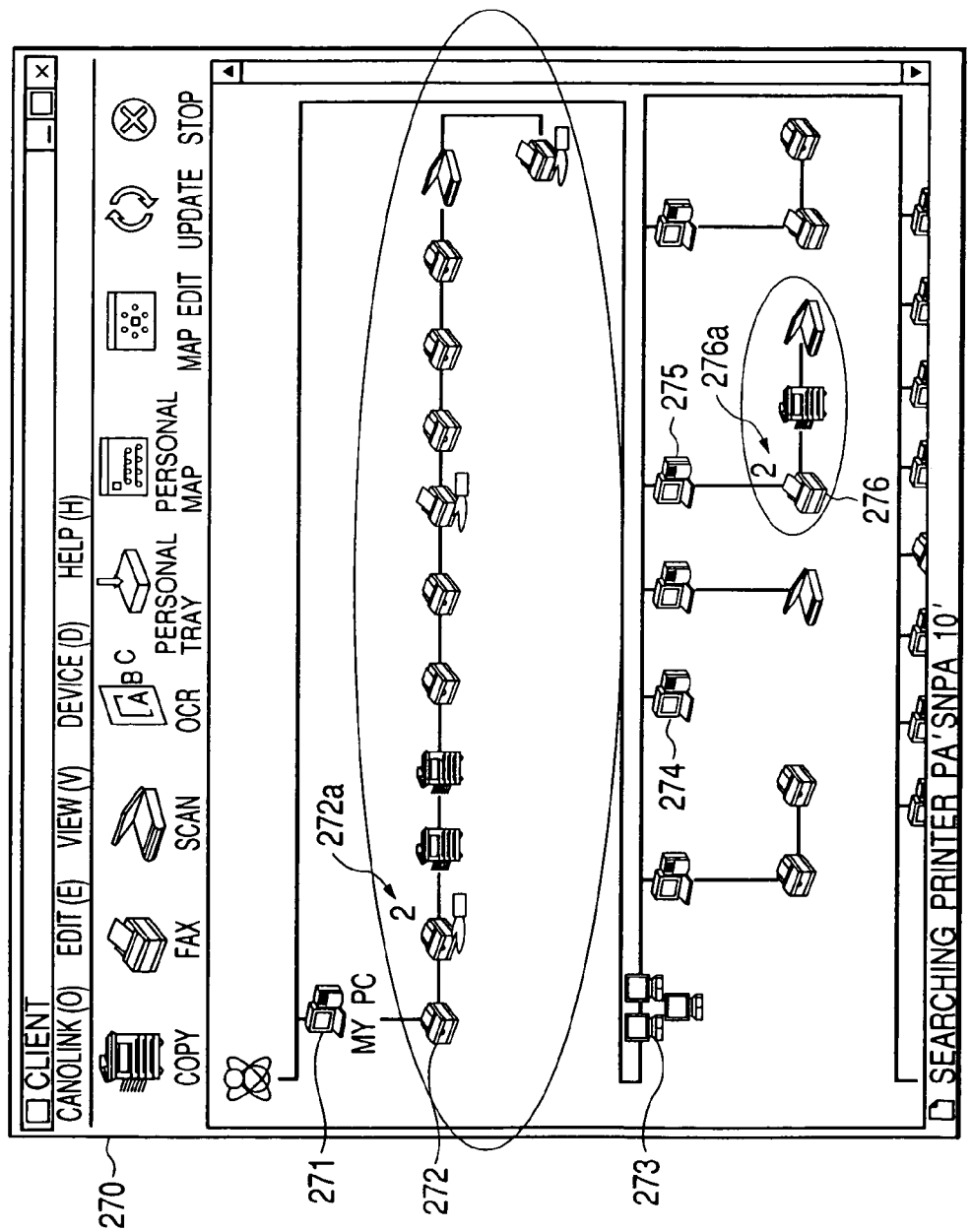
FIG. 9 is a view showing an image displayed on the host terminal apparatus.

FIG. 9 shows a display state (resource state) of a window image 270 on the CRT 16 of the host terminal apparatus $110_1$, $110_2$, $110_3$ or 120 on the network 130. This window image 270 displays icons and associated character information, based on the shared device management information as shown in FIG. 7.

As shown in FIG. 9, the present window image 270 displays an icon 271 indicating the own terminal apparatus and a usable resource group 272 locally connected to the own terminal apparatus. In the resource group 272, devices (resources) such as a scanner and a printer are displayed with appropriate icons assigned according to the attributes thereof. Also within such resources, a resource set as shared on the network 130 (shared resource) is displayed with a mark indicating the shared device, for example a "hand" mark. The resource displayed with such mark can be used from other host terminal apparatus on the network 130.

Each icon in the resource group 272 displays status information of the object shared device. For example, an icon 272*a* shown in FIG. 9 displays "2", indicating that two jobs are currently present in the shared device (printer etc.) corresponding to the icon 272*a*.

The present window image 270 also displays an icon 273 indicating a network group, icons 274, 275 indicating the host terminal apparatus present in such network group, and a usable resource group 276 locally connected to such host terminal apparatus. The icons indicating the resources in the resource group 276 do not display a mark indicating the shared device, such as the above-mentioned "hand" mark, since the host terminal apparatus 274, 275 are assumed to have no shared device, but an icon 276a in the resource group 276 displays "2", indicating that two jobs are currently present in the shared resource (printer etc.) corresponding to the icon 276a, as in the aforementioned icon 272a.

As explained in the foregoing, there is displayed the status information of the shared device, utilizing the server expansion function and the client expansion function in the present embodiment, whereby the user can immediately understand the state of the resources under the management of the host terminal apparatus in the network 130.

[Start-Up Function Of the Host Terminal Apparatus]

Figure 10:
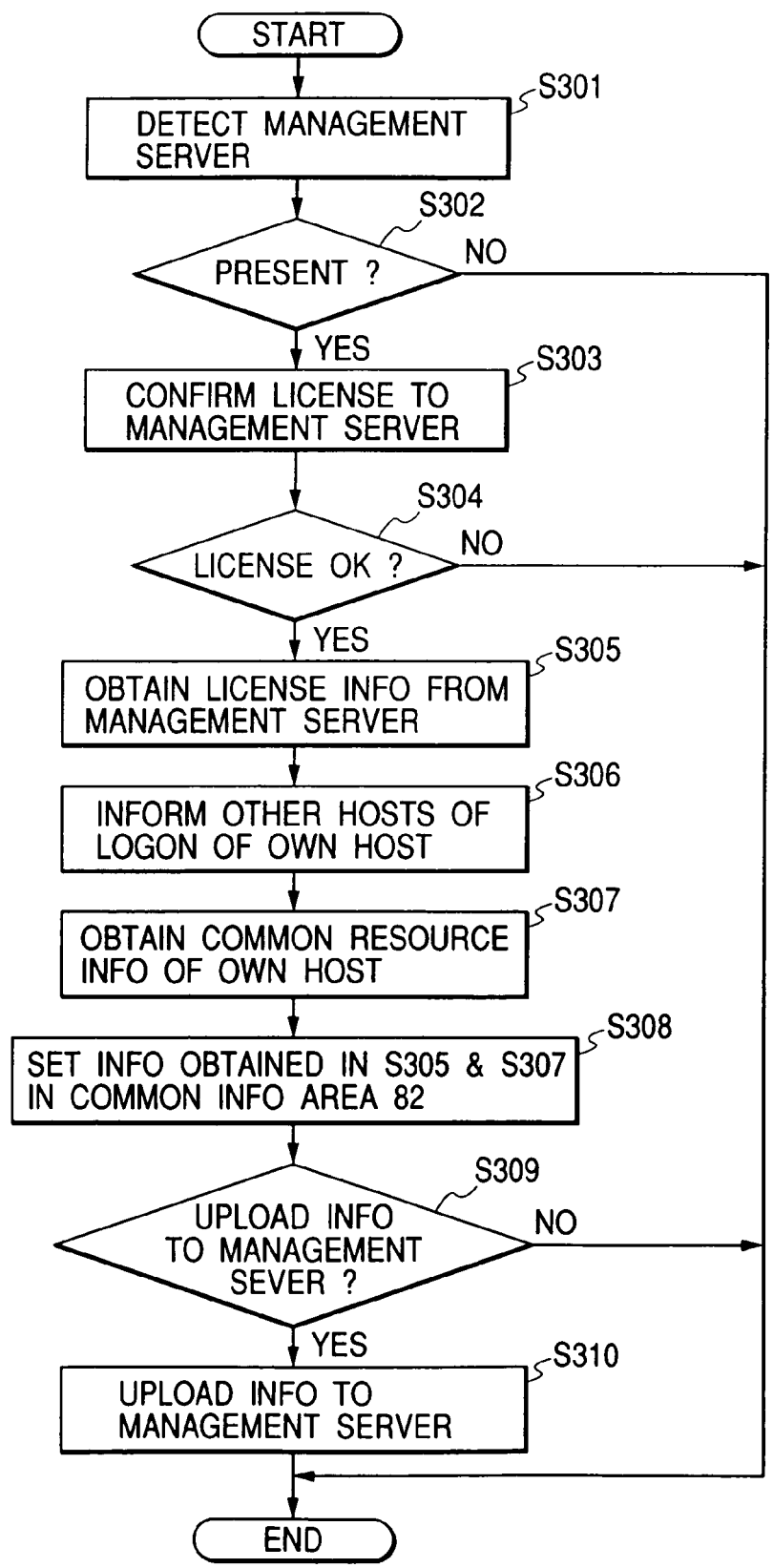
FIG. 10 is a flow chart showing the start-up function of the host terminal apparatus.

FIG. 10 shows a start-up sequence of the host terminal apparatus $110_1$, $110_2$, $110_3$, 120. The operations in this sequence are executed by the license information confirmation module 41.

At first there is detected a terminal apparatus having the management function (management server 120) on the network 130 (step S301), and, based on the result of such detection, there is discriminated whether the management server 120 is present (step S302). The detection and discrimination of the presence of the management server 120 can be achieved, for example, by broadcasting a message inquiring the presence of the management server 120 (an inquiry message according to the data configuration shown in FIG. 8) on the entire network 130 and discriminating whether a response from the management server 120 (a response message according to the data configuration shown in FIG. 8) is obtained in response to such broadcasting.

If the step S302 identifies that the management server 120 is absent on the network 130, the present sequence cannot be continued and is therefore terminated. If the step S302 identifies the presence of the management server 120 on the network 130, there is requested confirmation of the license for permitting the log-on to the management server 120 (step S303).

In response to the issuance of the request for license confirmation in the step S303, there is discriminated whether the license management module 72 in the management server 120 judges that such request for confirmation is from a request from a proper host terminal apparatus (client side) and that the number of permissible accesses from other host terminal apparatus (server side) still has a vacancy, namely whether the above-mentioned request for license confirmation is accepted (step S304).

If the step S304 identifies that the above-mentioned request for license confirmation is rejected at the side of the management server 120, the present sequence cannot be continued and is therefore terminated. If the step S304 identifies that the above-mentioned request for license confirmation is accepted by the management server 120, license information in response to the request for license confirmation is received from the management server 120 (step S305) and the sequence starting from a subsequent step S306 is executed.

At first the addition of the own host apparatus is informed by broadcasting to other host terminal apparatus on the network 130 (step S306). Then there is acquired information of the shared device connected to the own host apparatus (step S307). Then the shared device information acquired in the step S307, the access information (network information) of the management server 120, and the license information acquired in the step S305 are set, as the local management information as shown in FIG. 5, in the data area 82 (shared setting information storage area; cf. FIG. 4) provided between the network client function 112 and the network server function 111 (step S308). Then there is discriminated whether a host terminal apparatus having the entire network information management module 71 (management server 120 in this case) is present in the network 130, and there is also discriminated whether the information (resource information) set in the shared setting information storage area 82 in the step S308 is given to such host terminal apparatus (management server 120) (step S309).

If the step S309 identifies that the entire network information management module 71 in the network 130 and that the local management information (resource information) in the shared setting information storage area 82 is to be given to a host terminal apparatus (management server 120) having such module, such information is uploaded in the above-mentioned host terminal apparatus (management server 120) (step S310). Thus, the host terminal apparatus (management server 120) having the entire network information management module 71 manages the entire shared device management information as shown in FIG. 7, by means of such module 71. The present sequence is thereafter terminated.

Id the step S309 identifies that the entire network information management module 71 is absent in the network 130, the entire shared resource management information as shown in FIG. 7 is retained in the individual host terminal apparatus and the process of the step S310 need not be executed, so that the present sequence is immediately terminated.

[Status Changing Operation for the Resource of Host Terminal Apparatus (Server Side)]

Figure 11:
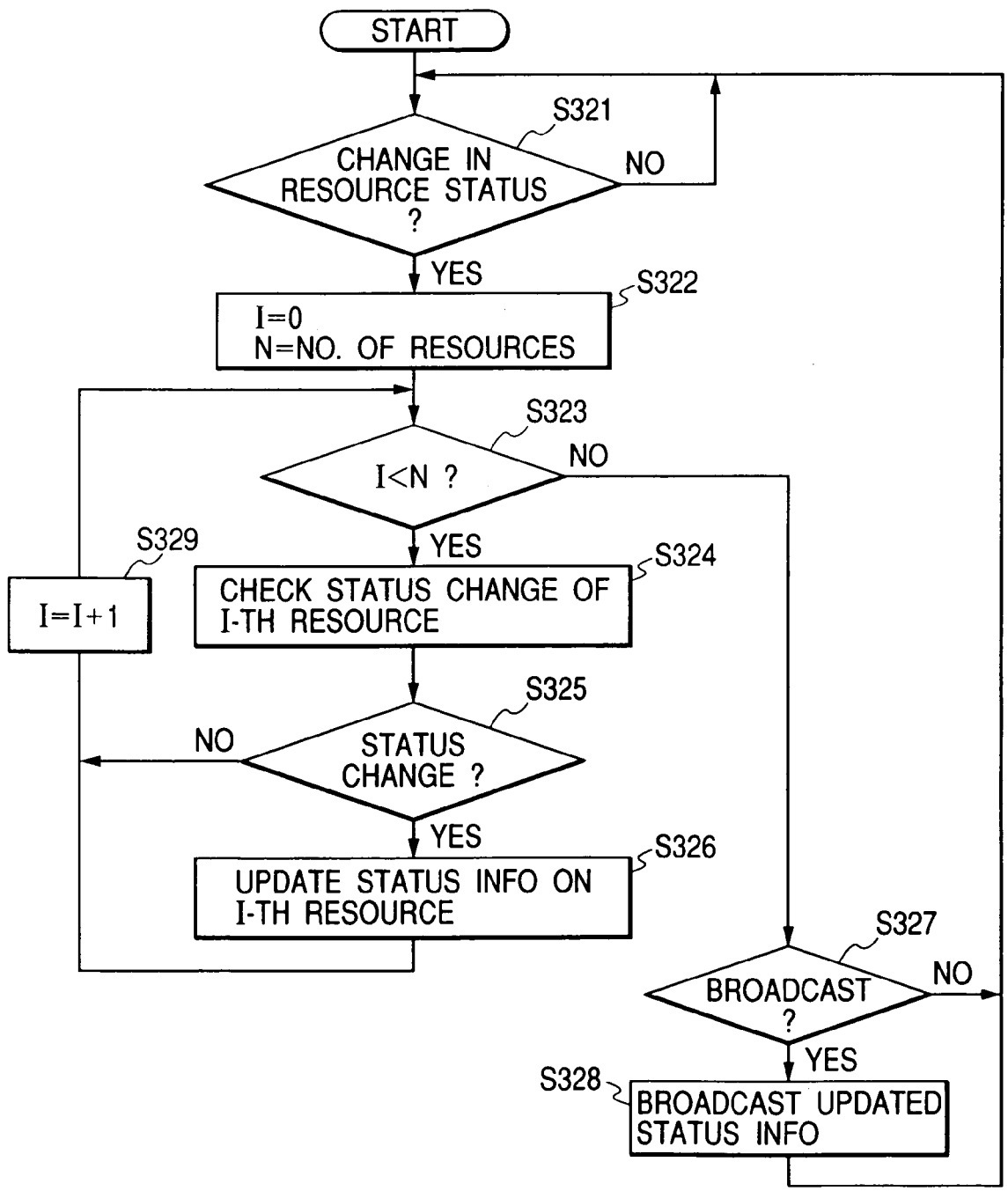
FIG. 11 is a flow chart showing a status changing operation (server side) of the shared device in the network system.

FIG. 11 shows a sequence for changing the status of the resource locally connected to the host terminal apparatus $110_1$, $110_2$, $110_3$, 120. This sequence is to change the shared resource management information as shown in FIG. 7 according to a change in the resource information 206 in the local management information as shown in FIG. 5, and is executed by the network server function 111. This sequence is always executed when the host terminal apparatus is in the activated state, and monitors the arrival of a resource status changing message (status change information) from the resource management modules $61_1$ to $61_N$.

At first there is realized a stand-by state for receiving status change information (for example information indicating a change in the number of jobs present in a printer resource) from the resource management modules $61_1$ to $61_N$, indicating a change in the status of the resource connected to the own host apparatus (step S321). The status change information is issued from the resource management modules $61_1$ to $61_N$ in case of a status change in at least one of all the resources connected to the own host apparatus. When the status change information is received in the step S321, there is executed a sequence starting from a next step S322.

When the status change information is received from the resource management modules $61_1$ to $61_N$, initialization is executed on the loop setting for acquiring the status information (step S322).

More specifically, a loop counter i is set at "0", and an upper limit set value N of the loop is set at the number of the resources locally connected to the own host apparatus (content of information 211 of the resource information 206; cf. FIG. 6).

Then there is discriminated, by comparing the value of the loop counter with the set value N, whether the status confirmation process has been completed for all the resources connected to the own host apparatus (step S323).

If the step S323 identifies that the status confirmation process has been completed, the sequence proceeds to a step S327 to be explained later. If the step S323 identifies that the status confirmation process has not been completed, there is compared the status information of an i-th resource set in the resource information 206 of the local management information and the status information on the i-th resource contained in the status change information received in the step S321 (step S324). Based on the result of comparison in the step S324, there is discriminated whether there is a change in the status of the i-th resource (step S325).

If the step S325 identifies that the status of the i-th resource has not been changed, the loop counter is counted up (step S329) and the sequence returns to the step S323 in order to process a next resource. If the step S325 identifies that the status of the i-th resource has been changed, the status information of the i-th resource currently set in the resource information 206 of the local management information is renewed by the status information on the i-th resource contained in the status change information received in the step S321 (step S326). Thereafter the loop counter is counted up (step S329) and the sequence returns to the step S323 in order to process a next resource.

When the status confirmation process is completed for all the resources connected to the own host apparatus (branched by the discrimination in the 323), there is discriminated whether a setting, for broad-casting the change information in the status renewing process on the network 130, is turned on (step S327).

If the step S327 identifies broadcasting, the status information changed in the present sequence is broadcast on the network 130 (step S328). Thus, in case the host terminal apparatus having the entire network information management module 71 (management server 120 in this case) is present in the network 130, the shared device management information (cf. FIG. 7) held in such host terminal apparatus is renewed by the above-mentioned change information, as will be explained later in more details. In case the host terminal apparatus having the entire network information management module 71 is absent in the network 130, the shared device management information (cf. FIG. 7) held in the individual host terminal apparatus is changed according to the change information. Then the sequence returns to the step S321 for awaiting the reception of the status change information from the resource management modules 61$_1$ to 61$_N$.

If the step S327 identifies absence of broadcasting, the sequence returns to the step S321 for awaiting the reception of the status change information from the resource management modules 61$_1$ to 61$_N$. Thus, in this case, the status change information is not informed until a request for acquiring the change information is received from another host terminal apparatus.

[Status Changing Operation for the Status Information of Host Terminal Apparatus (client side)]

Figure 12:
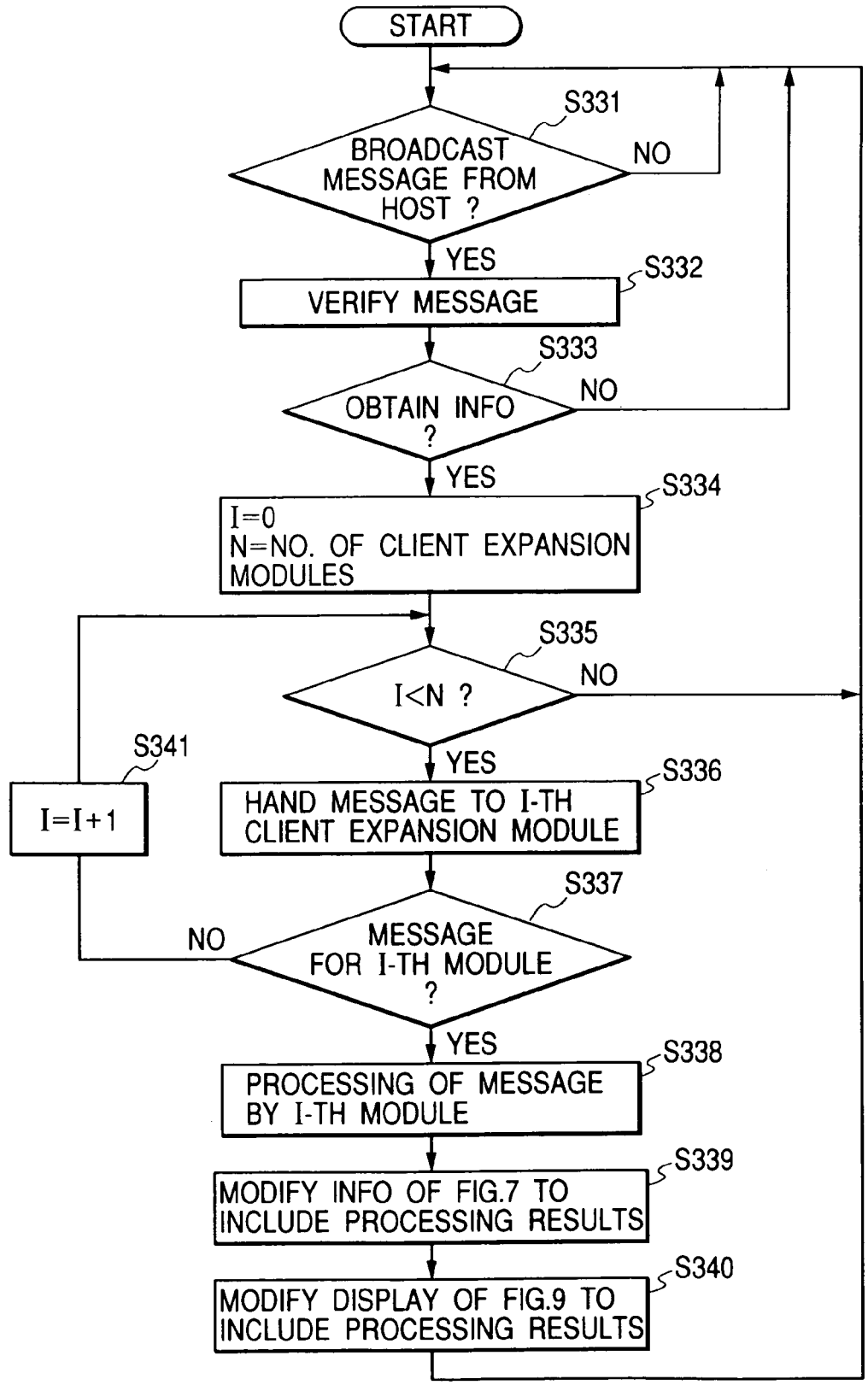
FIG. 12 is a flow chart showing a status changing operation (client side) of the shared device in the network system.

FIG. 12 shows a sequence in the host terminal apparatus 110$_1$, 110$_2$, 110$_3$, 120 according to the status change information informed by the network server function 111 of another host terminal apparatus or the own host apparatus. This sequence is executed by the network client function 112.

At first there is entered a stand-by state for awaiting the reception of a broadcast message by the network server function 111 (step S331). When the broadcast message is received in the step S331, there is executed a sequence starting from a next step S332.

When a broadcast message is received from the network server function 111, there is confirmed the content of the message (step S332). Based on the confirmation in the step S332, there is discriminated whether the received message is from a partner from which the own host apparatus is to acquire the information (step S333).

If the step S333 identifies that the message is not from a partner from which the information is to be acquired, the sequence returns to the step S331 to enter the state of awaiting the reception of the broadcast message. If the step S333 identifies that the message is from a partner from which the information is to be acquired, initialization is executed on the loop setting for processing all the client expansion modules 31$_1$ to 31$_N$, (step S334). More specifically, the loop counter i is set at "0", and the upper limit set value N of the loop is set at the number of the client expansion modules 31$_1$ to 31$_N$ by referring to the client expansion function information etc. of the local management information shown in FIG. 6. Then there is discriminated, by comparing the value of the loop counter i with the set value N, whether the process has been completed for all the client expansion modules 31$_1$ to 31$_N$ (step 335).

If the step S335 identifies that the process has been completed for all the client expansion modules 31$_1$ to 31$_N$, the sequence returns to the step S331 for awaiting the reception of the broadcast message. If the step S335 identifies that the process has not been completed for all the client expansion modules 31$_1$ to 31$_N$, the message received in the step S331 is transferred to the i-th client expansion module (step S336). The i-th client expansion module receiving the message in the step S336 discriminates whether such message is to be processed by the own module (step S337).

If the step S337 identifies that the message is not for processing by the own module, the i-th client expansion module informs the network client function 112 of such fact. Thus the network client function 112 counts up the loop counter (step S341) and the sequence returns to the step S335 for processing a next resource.

If the step S337 identifies that the message is for processing by the own module, the i-th client expansion module executes a process according to the message (step S338), and informs the network client function 112 of the result of the process. Thus the network client function 112 causes the shared device management information shown in FIG. 7 to reflect the result of process by the i-th client expansion module (step S339). Thus the result of the above-mentioned process is also reflected on the image on the CRT 16 as shown in FIG. 9, namely on the image according to the shared device management information (step S340). For example, the status information 272$a$, 276$a$ as shown in FIG. 9 change according to the current resource status. Thereafter the sequence returns to the step S331 for awaiting the reception of a broadcast message.

[Information Acquiring Operation of Designated Resource]

Figure 13:
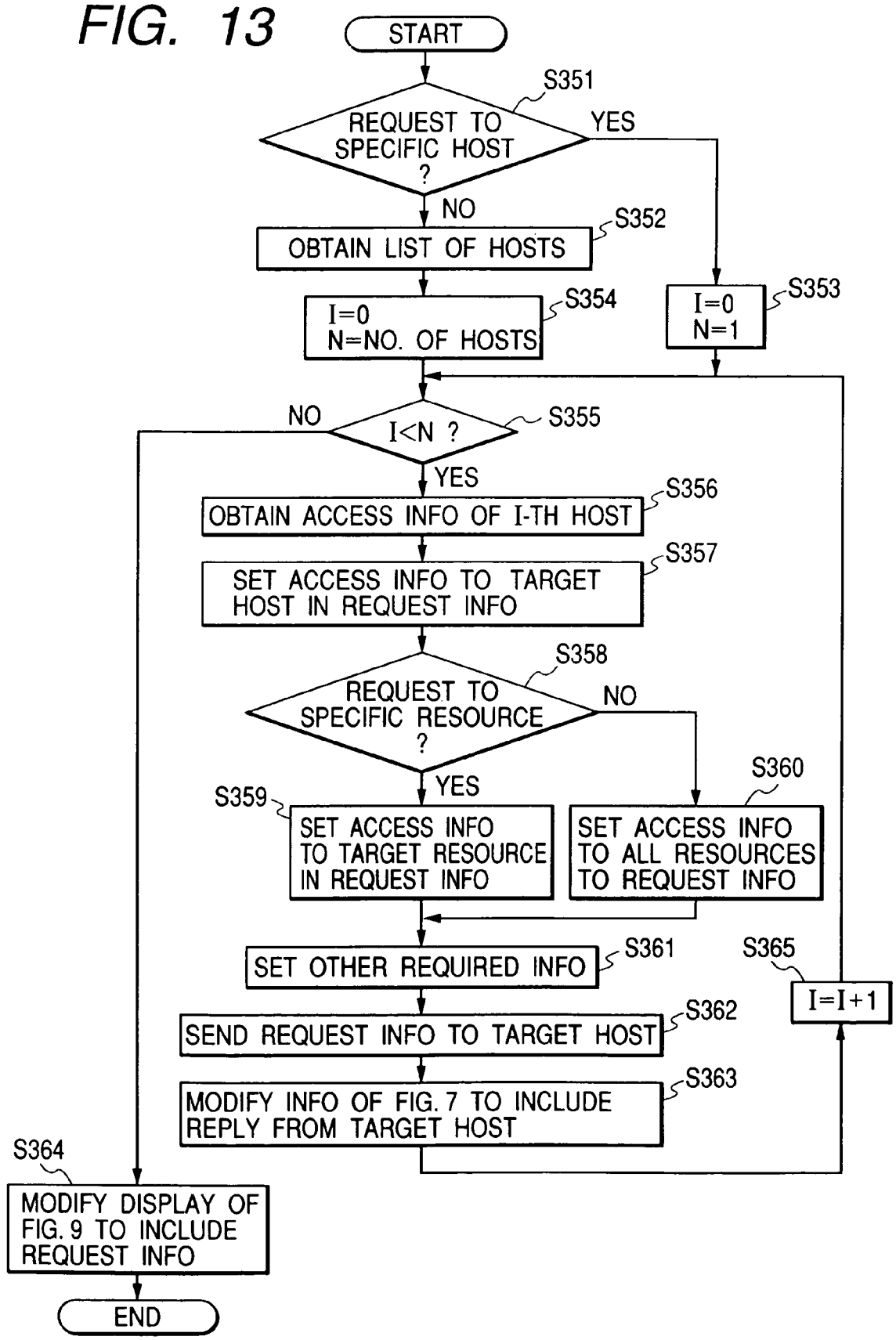
FIG. 13 is a flow chart showing an operation for acquiring the status information of a designated resource in the above-mentioned host terminal apparatus.

FIG. 13 shows a process, in the host terminal apparatus 110$_1$, 110$_2$, 110$_3$, 120, for acquiring the status information of a designated resource. This process is effective in case, in the process shown in FIG. 11, the broadcast execution is set "OFF" in order to suppress the increase in the network traffic by the frequent broadcast issuances on the network 130 (cf. step S327 in FIG. 11), and is executed by the network client function 112.

As an example of the method for the user for designating the shared status, the user of the host terminal apparatus of the client side requests the status information by a manual operation from the group of shared devices satisfying a certain condition, among the shared devices connected to other host terminal apparatus. The user designates a target group satisfying the desired condition, by executing a predetermined operation on the display image shown in FIG. 9. The target group can be a group of shared devices connected in the unit of host terminals contained in a network group (domain etc.), or a group of shared devices connected in a certain specified unit of the host terminals, or a group (printer group etc.) of shared devices of a certain category. For the purpose of simplicity of explanation, it is assumed to designate the desired shared devices in the same network 130, but such method is not restrictive and there may be designated the shared devices in another network.

At first there is discriminated, by request information (status acquisition requesting information entered by the user) from the network client function 112 of another host terminal apparatus or the own host apparatus, whether the target host terminal apparatus is a specified single host terminal apparatus or plural host terminal apparatus (step S351). If the step S351 identifies that the target host terminal apparatus is composed of plural host terminal apparatus, there is acquired access information corresponding to such host terminal apparatus (in case of a domain such as NT, information of hosts belonging thereto, namely a list of hosts constituting the network group) from the shared resource management information as shown in FIG. 7 (step S352).

Then the loop counter is initialized for preparing request information on the target host terminal apparatus (step S354). More specifically, the loop counter is set at "0", and the upper limit set value N of the loop is set at the number of the access information (number of the target host terminal apparatus) acquired in the step S352.

On the other hand, if the step S351 identifies that the target host terminal apparatus is a specified single host terminal apparatus, there is acquired access information corresponding to such host terminal apparatus from the shared resource management information as shown in FIG. 7 and the loop counter is initialized for preparing request information to be explained later on such host terminal apparatus (step S353). More specifically, since there is only one target host terminal apparatus in this case, the loop counter is set at "0", and the upper limit set value N of the loop is set at "1".

Then there is discriminated whether the process has been completed for all the host terminal apparatus indicated by the set value N, by comparing the value of the loop counter and the set value N (step S355). If the step S355 identifies that the process has been completed for all the host terminal apparatus, the sequence proceeds to a step S364 to be explained later.

If the step S355 identifies that the process has not been completed for all the host terminal apparatus, there is acquired access information for the i-th host terminal apparatus (network identification information such as an IP address for accessing to a specified host) from the access information acquired in the step S352 or S353 step S356). Then the network address information (cf. FIG. 7) included in the access information acquired in the step S356 is set in the request information which is response information to the issuing source of the above-mentioned status acquisition request information (step S357). Then, there is discriminated whether the target shared resource indicated by the aforementioned status acquisition request information is a specified resource of the i-th host terminal apparatus (step S358).

If the step S358 identifies that the target is a specified resource, the information corresponding to such resource (password information, user identification information etc.) is acquired from the access information (cf. FIG. 7) acquired in the step S356 and is set in the request information (step S359). If the step S358 identifies that the target is not a specified resource, the information of all the shared resources (information $237_1$ to $237_N$ in FIG. 7) included in the access information (cf. FIG. 7) acquired in the step S356 is set in the request information (step S360).

After the step S359 or S360, other information if necessary are set in the request information including various information set in these steps (step S361). Then the request information, that has been prepared in the step S361, is transmitted to the network client function 112 of the issuing source of the aforementioned status acquisition request information (network client function 112 of another host terminal apparatus or own host apparatus) (step S362). Then a response value is received from the target host terminal apparatus, and is reflected on the shared device management information shown in FIG. 7 (step S363). Thereafter the loop counter is counted up (step S365) and the sequence returns to the step S355 for processing a next host terminal apparatus.

When the process has been completed for all the host terminal apparatus as explained in the foregoing (branched according to the discrimination of the step S355), the network client function 112, receiving the request information by the process of the step S362, causes such request information to be reflected on the image on the CRT 16 of the own host apparatus (step S364). In this manner the status information (272a, 276a etc.) is displayed on the icon of the desired shared device as shown in FIG. 9.

Second Embodiment

In a second embodiment, there will be explained a host terminal apparatus capable of dynamically reflecting the status of the shared devices of such host terminal apparatus, in response to a log-on or a log-off of the host terminal apparatus on the network system. In the following there will be principally explained features newly added to the foregoing first embodiment.

[Access Operation to a Shared Device Under Management by Other Host Terminal Apparatus]

Figure 14:
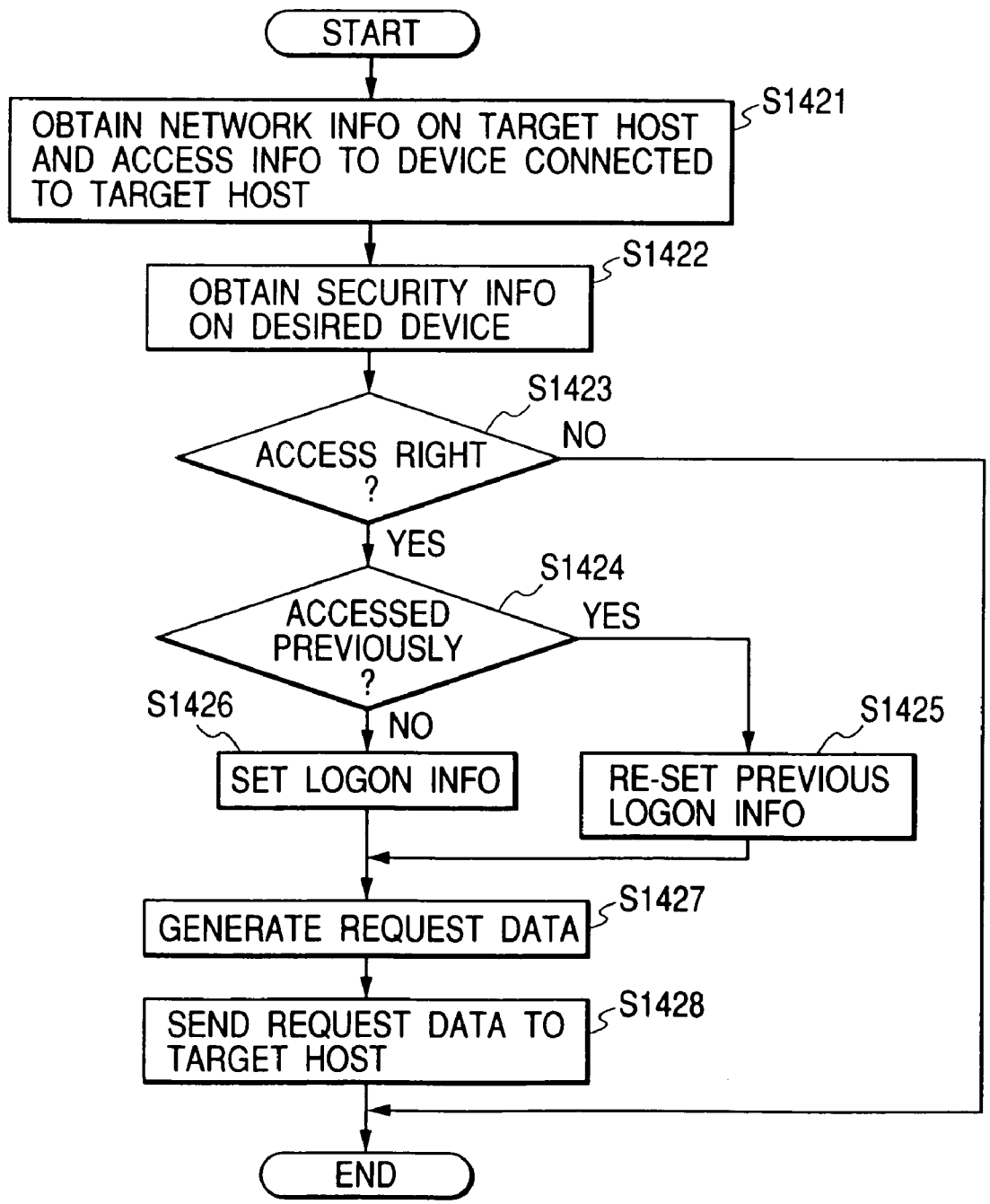
FIG. 14 is a flow chart showing an access operation to the shared device in the network system.

FIG. 14 shows the function of the client side host terminal apparatus in case an arbitrary one (client side host terminal apparatus) of the host terminal apparatus $110_1$, $110_2$, $110_3$, 120 uses a shared device connected to another host terminal apparatus (server side host terminal apparatus). The operation in this case are executed by the communication of the network client function 112 of the client side host terminal apparatus with the network server function 111 of the server side host terminal apparatus.

At first there are acquired the network address of a target host terminal apparatus (server side host terminal apparatus) and the access information of a desired shared device under the management thereof (step S1421). More specifically, in case a host terminal apparatus having the entire network information management module 71 (namely the management server 120 in this case) is present in the network 130, the information of the target host terminal apparatus (server side host terminal apparatus) is acquired from the shared device management information (cf. FIG. 7) held in such host terminal apparatus. In case such host terminal apparatus having the entire network information management module 71 is absent in the network 130, the information of the target host terminal apparatus (server side host terminal apparatus) is acquired from the shared device management information (cf. FIG. 7) held in the own host apparatus.

Then, based on the information acquired in the 1422, an access is made to the desired shared device of the server side host terminal apparatus for acquiring the security information thereof (step S1422). Then the content of the access information acquired in the step S1421 and the security information acquired in the step S1422 is confirmed to discriminate whether the own host apparatus (client side host terminal apparatus) has a right of access to the desired shared device of the partner (server side host terminal apparatus) (step S1423).

If the step S1423 identifies the absence of access right, the accessing process is interrupted and the present sequence is terminated. If the step S1423 identifies the presence of access right, there is discriminated whether the own host apparatus (client side host terminal apparatus) has ever made an access to the host terminal apparatus to be accessed (server side host terminal apparatus) (step S1424).

If the step S1424 identifies that the access has been made before, the local management information (cf. FIG. 5) of the own host apparatus (client side host terminal apparatus) is referred to and the log-on information therein is reset as the current log-on information for the host terminal apparatus to be accessed (server side host terminal apparatus) (step S1425). If the step S1424 identifies that the access has not been made before, namely the access for the first time, there is set new log-on information (step S1426). More specifically, the log-on information acquired for example by asking the input of an access password to the currently logged-on user is set as the current log-on information for the host terminal apparatus to be accessed (server side host terminal apparatus).

After the process of the step S1425 or S1426, there are generated, together with the log-on information set by such process, request data to the host terminal apparatus to be accessed (server side host terminal apparatus) according to the data configuration shown in FIG. 8 (step S1427). Then the request data generated in the step S1427 are transmitted to the host terminal apparatus to be accessed (server side host terminal apparatus), and response data thereto are received (step S1428). Thereafter the present sequence is terminated.

[Renewal Operation for Shared Device Management Information Within the Network]

Figure 15:
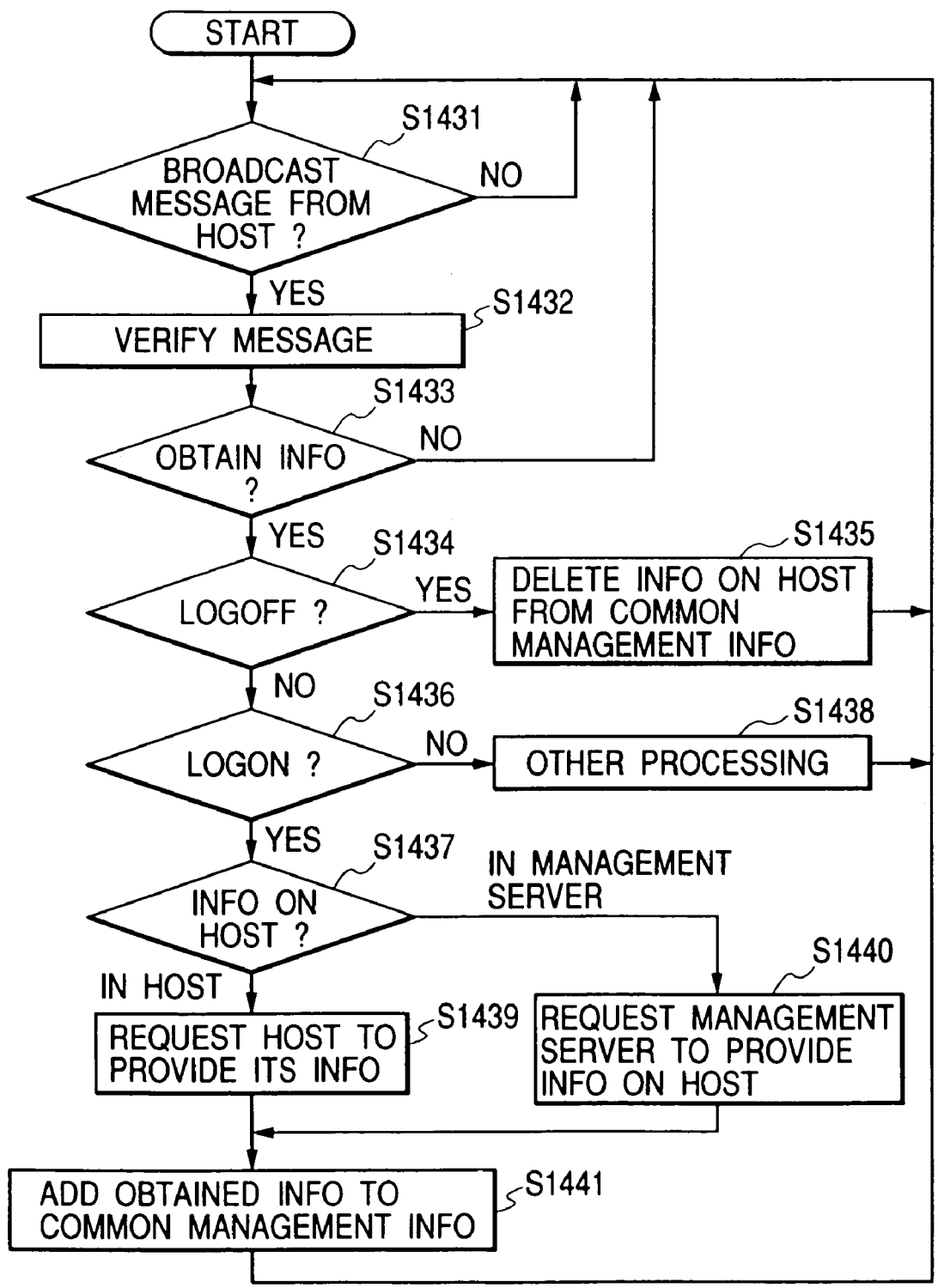
FIG. 15 is a flow chart showing an addition/renewal process for the management information of all the shared devices in a second embodiment.

FIG. 15 shows a renewal operation for the shared device management information (cf. FIG. 7) in the network 130. As explained in the foregoing, if a host terminal apparatus having the entire network information management module 71 (management server 120 in this case) is present in the network 130, the shared device management information is held by the entire network information management module 71. If the host terminal apparatus having the entire network information management module 71 is absent in the network 130, the shared device management information is held by the individual host terminal apparatus.

Such renewal process for the shared device management information is constantly executed by the client expansion function addition/deletion management module 23 and the server expansion function addition/deletion management module 53 whenever the host terminal apparatus is in the activated state, constantly monitoring the arrival of a message from other host terminal apparatus on the network 130.

At first there is entered a state awaiting a broadcast message from other host terminal apparatus (step S1431). If the step S1431 receives a message, there is executed a process starting from a next step S1432.

Upon receiving a message from another terminal apparatus, there is confirmed the content of such message (step S1432). Based on the confirmation in the step S1432, there is discriminated whether the received message is from a host terminal apparatus from which the own host apparatus is to acquire the information (step S1433).

If the step S1433 identifies that the received message is from a host terminal apparatus from which information is not be acquired, the sequence returns to the step S1431 for entering again a state awaiting the message from other host terminal apparatus. If the step S1433 identifies that the received message is from a host terminal apparatus from which information is to be acquired, there is discriminated whether the message is a log-off message (step S1434).

If the step S1434 identifies a log-off message, the information of the host terminal apparatus which has transmitted such message is deleted from the shared device management information (step S1435). More specifically, in case the shared device management information is held by the individual host terminal apparatus, the information of the host terminal apparatus which has transmitted the log-off message is deleted from the shared device management information in the own host apparatus. In case the shared device management information is held by the entire network information management module 71, a deletion request is made to the host terminal apparatus having the entire network information management module 71 (management server 120 in this case). Thereafter the sequence returns to the step S1431 for entering again a state awaiting the message from other host terminal apparatus.

If the step S1434 identifies that the received message is not a log-off message, there is discriminated whether the message is a log-on message (step S1436). If the step S1436 identifies that the received message is not a log-on message, namely in case of reception of a message other than the log-on or log-off message, there is executed an appropriate process matching the content of such message (step S1438). Thereafter the sequence returns to the step S1431 for entering again a state awaiting the message from other host terminal apparatus.

If the step S1436 identifies that the received message is a log-on message, there is discriminated where the shared resource management information is held (step S1437).

If the step S1437 identifies that the shared device management information is held by the entire network information management module 71, there is requested acquisition of the information of the host terminal apparatus which has transmitted the log-on message, to the host terminal apparatus having such entire network information management module 71 (management server 120 in this case) (step S1440). Thereafter the sequence proceeds to a step S1441.

If the step S1437 identifies that the shared device management information is held by the individual host terminal apparatus, there is requested acquisition of detailed information to the host terminal apparatus which has transmitted the log-on message (step S1439). Thus the local management information (cf. FIG. 5) of the host terminal apparatus which has transmitted the log-on message is returned to the own host apparatus. Thereafter the sequence proceeds to a step S1441.

The information acquired in the step S1439 or 1440 is added to (or renews) the shared device management information (step S1441).

[Log-Off Operation of Host Terminal Apparatus]

Figure 16:
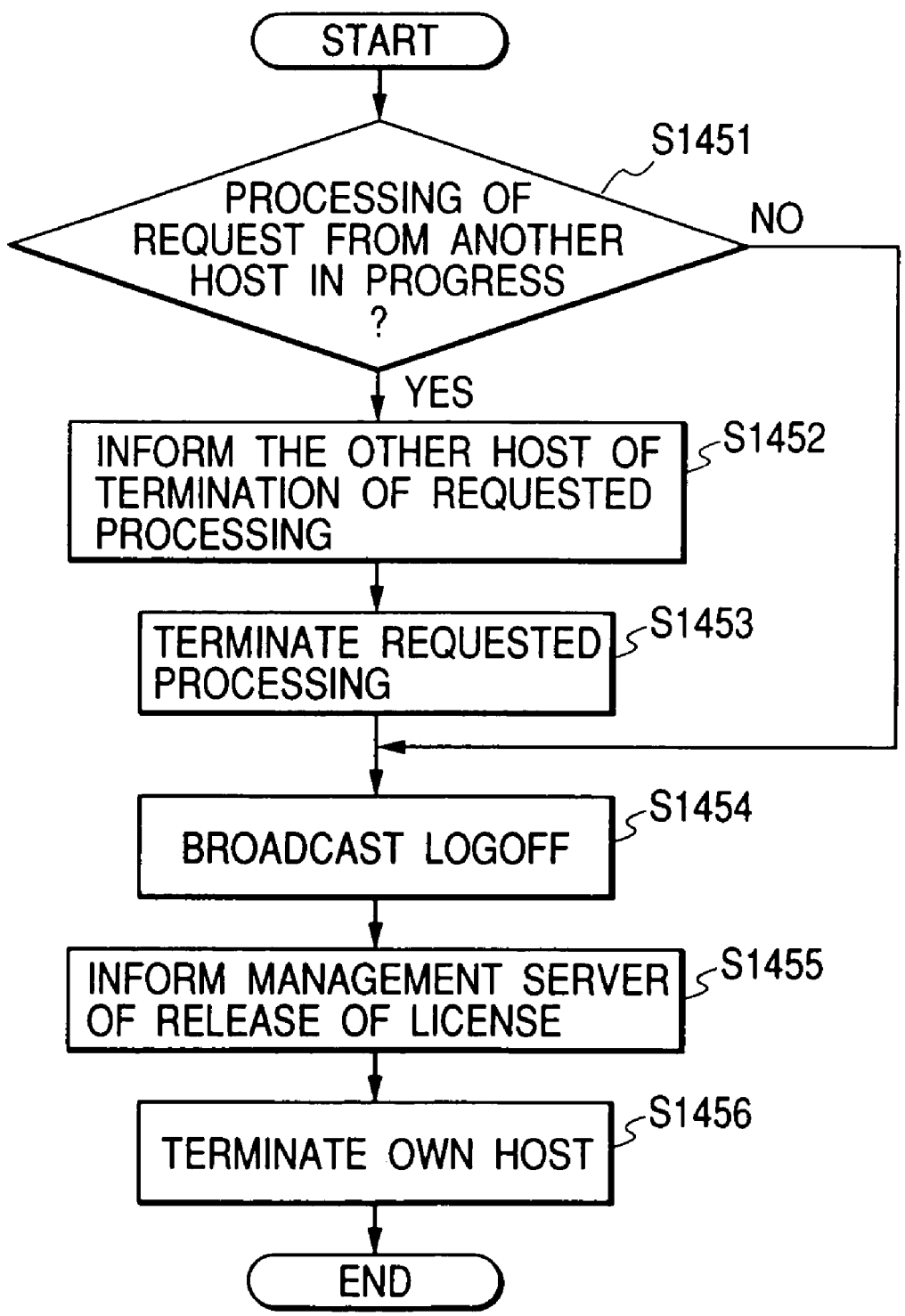
FIG. 16 is a flow chart showing an log-off operation of the host terminal apparatus in the second embodiment.
Figure 17:
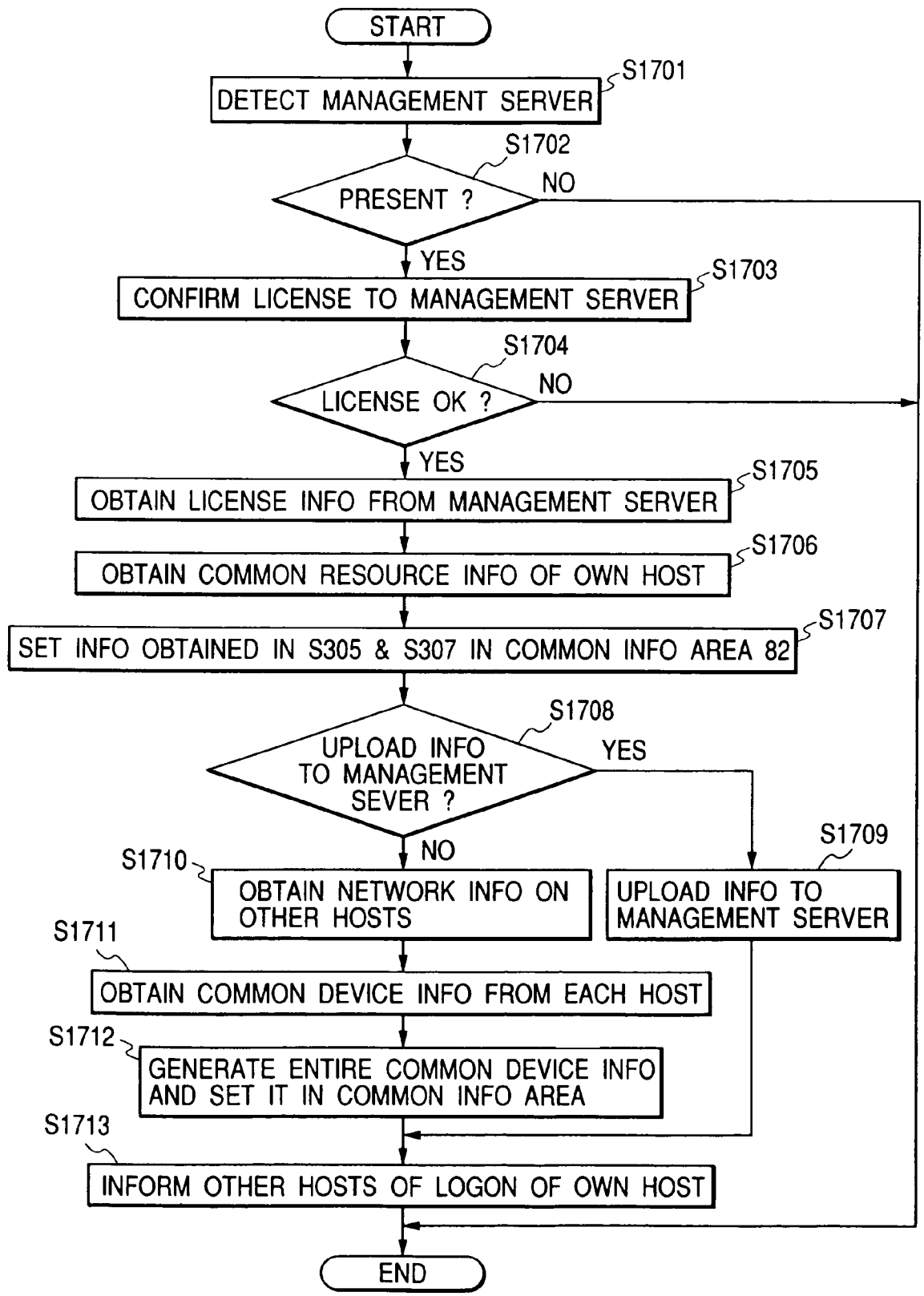
FIG. 17 is a flow chart of a start-up process of the host terminal apparatus in a third embodiment.

FIG. 16 shows the log-off operation of the host terminal apparatus $110_1$, $110_2$, $110_3$, 120.

At first there is discriminated whether the own host apparatus is in the course of execution of a process based on a request from another host terminal apparatus (step S1451). If the step S1451 identifies that the process is not in execution, the sequence proceeds to a step S1454, skipping next steps S1452 and S1453.

If the step S1451 identifies that the process is in execution, there is informed the interruption of such process to the host terminal apparatus which has requested such process (step S1452).

After confirmation that a response permitting the interruption is returned, in response to the informing, from the addressee host terminal apparatus of such informing, the process currently executed is interrupted (step S1453).

After the process of the step S1453 or in case the step S1451 identifies that the process is not in execution, namely when the own host apparatus is no longer in the state of process execution, the log-off operation of the own host apparatus is informed by broadcasting to other host terminal apparatus on the network 130 (step S1454). Also the host terminal apparatus having the management function (manager server 120 in this case) is informed of the release of the log-on license given to the own host apparatus at the log-on operation (step S1455). Thereafter the ending process for the own host apparatus is executed in continuation (step S1456).

In the second embodiment, as explained in the foregoing, in response to the log-on or log-off operation of a host terminal apparatus on the network system, the status of the shared device of such host terminal apparatus can be dynamically reflected.

Third Embodiment

As a third embodiment, there will be explained an improvement on the process (start-up flow of the host terminal apparatus) of the first embodiment shown in FIG. 10. In the third embodiment, the management side only manages the license information and the log-on list of the host terminals, and, in case of not managing the shared device information of the host terminal, acquires the shared device information from each host terminal. In the following there will be principally explained the features newly added in the third embodiment.

A step S1701 detects the presence of a terminal apparatus having the management function (management server) on the network. Based on the result of such detection, a step S1702 discriminates whether the management server is present. The detection of the management server and the discrimination of presence thereof can be achieved, for example, by broadcasting a message inquiring the presence of the management server to the entire network and judging the presence of a response thereto.

If the step S1702 identifies that the management server is absent on the network, the process cannot be continued further and is therefore terminated. If the step S1702 identifies the presence of the management server, a step S1703 requests confirmation of the license for log-on permission to the management server.

The confirmation of the license in the step S1704 identifies that such request is from a proper host terminal apparatus and that the number of permissible accesses in the server side still has a vacancy, the sequence branches to a step S1705. If the effective license is judged absent, the sequence cannot be continued further and is therefore terminated.

A step S1705 receives the license information from the management server. A step S1706 acquires the shared device information of the own host apparatus. Then a step S1707 sets the acquired shared device information, the network information for accessing to the management server and the license information acquired in the step S1705, as the local information, in the shared setting information storage area provided between the network client function and the network server function.

Then a step S1708 discriminates whether the entire network information management module is set in the management server and whether uploading of the shared device information of the own host apparatus is instructed to such module. If the uploading is instructed, the sequence proceeds to a step S1709, but, if not instructed, the sequence proceeds to a step S1710.

A S1709 uploads the shared device information of the own apparatus to the management server, whereby other host terminals on the network can acquire the shared device information of the newly added host terminal by inquiring to the management server. Thereafter the sequence proceeds to a step S1713.

Steps S1710 to S1712 are a process in case the management server does not manage the shared devices on the network. A step S1710 acquires, from the management server, a network information list of other logged-on host terminals. A step S1711 acquires the shared device information from the individual host terminals, according to the information of the above-mentioned list. A step S1712 prepares the entire shared device information on the network as shown in FIG. 7, based on the information acquired in the step S1711, and sets such entire shared device information in the shared setting information storage area of the server/client modules.

As all the access information setting relating to the network is completed, a step S1713 broadcasts the addition of the own apparatus to other host terminals on the network, in order to inform that the own apparatus is being ready. Thus all the processes are completed.

In the third embodiment, as explained in the foregoing, it is rendered possible to manage the resource (shared device) usable by other terminals through the network even in case the management terminal does not manage the information of the shared device of the individual host terminals, thereby efficiency checking status of the resources.

Fourth Embodiment

As a fourth embodiment, there will be explained a method of applying the present invention to a network system not containing the management server terminal. In the present embodiment, at the start-up of the host terminal, there is not executed the process of confirming the license to the management server terminal. More specifically, there is given an example of the process in case the function is present in the host terminal with the local license. For example, in case of Windows system (trade name), the first to third embodiments provide license management by domains, while the fourth embodiment provides license management by work groups. In the following there will be principally explained the features newly added to the fourth embodiment.

Figure 18:
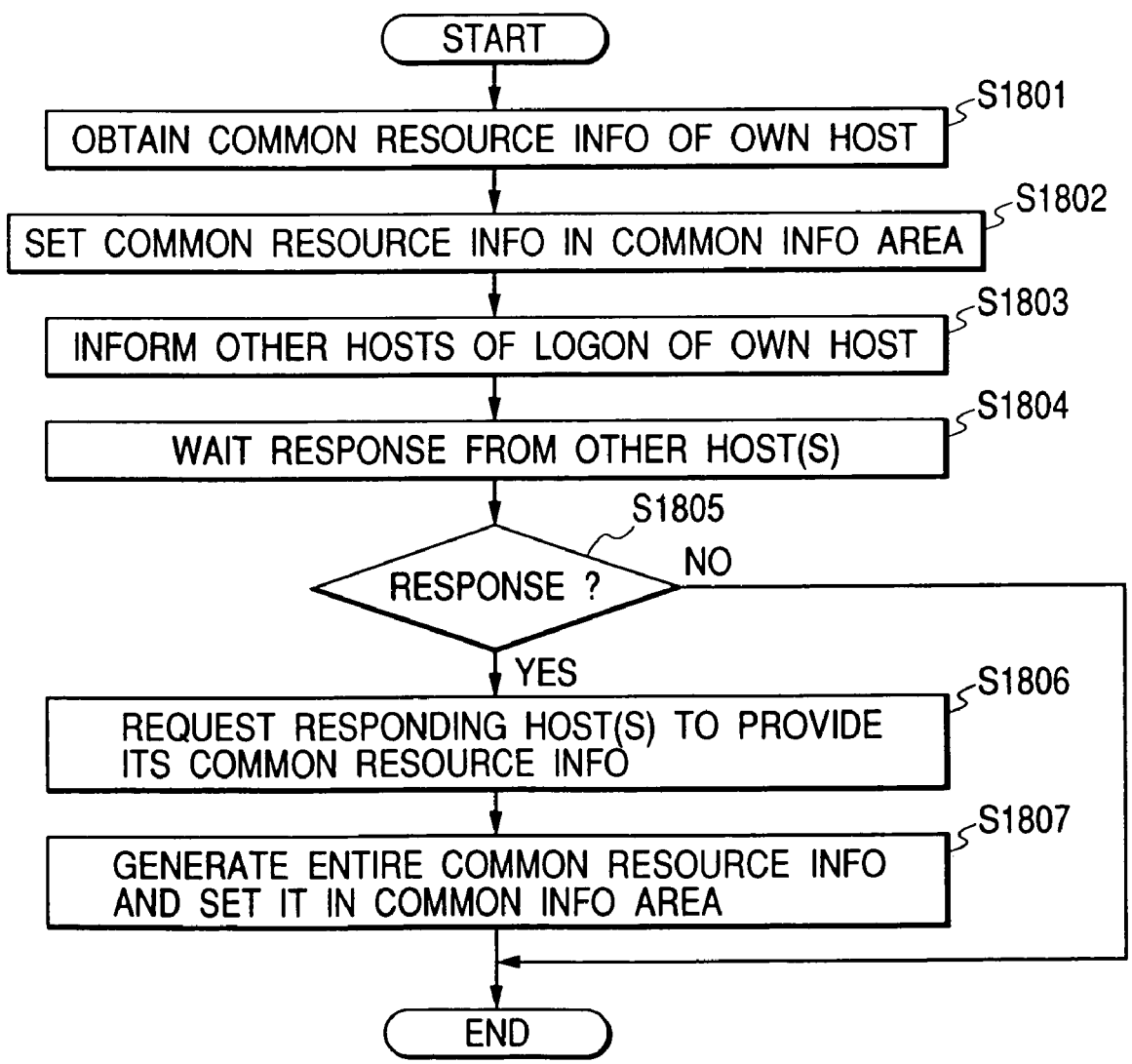
FIG. 18 is a flow chart of a start-up process of the host terminal apparatus in a fourth embodiment.

FIG. 18 is a flow chart of a start-up process of the host terminal in case the management server terminal is absent. In the following description will be given according to the flow chart shown in FIG. 18.

A step S1801 acquires the shared device information of the own apparatus. A next step S1802 sets the above-mentioned shared device information, as the local information, in the shared setting information storage area provided between the network client function and the network server function. A step S1803 broadcasts the addition of the own apparatus to other host terminals in the network, in order to inform that the shared device of the own apparatus has become ready for disclosure. A step S1804 awaits the response from other host terminals, in return for the above-mentioned broadcast message informing the above-mentioned addition. The network address of the partner can be acquired from the response of another host terminal.

A step S1805 discriminates whether the response is made within a predetermined time, and, if the response is judged present, the sequence proceeds to a step S1806, but, if the response is judged absent, the start-up process is terminated.

A step S1806 requests, to each host terminal giving the response, the shared device information of such host terminal. A step S1807 prepares the entire shared device information on the network as shown in FIG. 7, based on the shared device information of the host terminals on the network, obtained in the step S1806, and additionally sets such entire shared device information to the shared setting information storage area of the server/client modules, whereupon the process is terminated.

In the fourth embodiment, as explained in the foregoing, it is rendered possible, even in the network system in which the management terminal is not present, to manage the resource (shared device) usable by other terminal apparatus through the network, thereby efficiently checking the status of the resources.

The objects of the present invention can naturally be attained also in a case where a memory medium storing the program codes of a software realizing the functions of the host and terminals of the aforementioned embodiments is supplied to a system or an apparatus and the functions of the aforementioned embodiments are realized by a computer (CPU or MPU) of the above-mentioned system or apparatus by reading and executing the program codes stored in the memory medium. In such case the program codes themselves realize the functions of the embodiments of the present invention, and the memory medium storing the program codes constitutes the present invention.

The memory medium storing such program codes can be, for example, a ROM, a floppy disk, a hard disk, an optical disk, a magnetooptical disk, a CD-ROM, a CR-R, a magnetic tape, or a non-volatile memory card.

The present invention also includes not only a case where the functions of the aforementioned embodiments are realized by the execution of the program codes read by the computer but also a case where an operating system or the like functioning on the computer executes all or a part of the actual processes under the control of such program codes thereby realizing the functions of the foregoing embodiments. The present invention further includes a case wherein the program codes read from the memory medium are once stored in a function expansion board inserted into the computer or a function expansion unit connected to the computer, and a CPU provided in the function expansion board or the function expansion unit executes all the process or a part thereof under the control of such program codes, thereby realizing the functions of the aforementioned embodiments.

According to the present invention, as explained in the foregoing, there are provided both the server means and the client means, and communication means for connecting these means whereby the information exchange can be achieved in the same manner regardless whether it is with another apparatus or within the own apparatus. Also there are provided both server expansion means as an expanded function of the server means having a general interface and client expansion means as an expanded function of the client means having a general interface. Also the information of the shared devices present on the network is managed in unified manner, and the management information of the shared devices is automatically renewed with the latest information, by the information of such shared device (for example the information disclosed in case of a status change) disclosed from the terminal apparatus having such shared device. Furthermore, the information of the shared device designated by the client means side is acquired from the management information of the shared devices and is provided. It is thus rendered possible to easily acquire the information of the shared devices on the network and to efficiently manage such information.

It is also possible to manage the management information of the shared devices constantly as the latest information, and to provide the information of the shared device designated from the user, based on such management information. For example, in case the management information of the shared devices is displayed, the user can easily and exactly confirm the status of the current shared devices and can acquire the status of the desired shared device only.

What is claimed is:

1. An information processing apparatus which manages a first shared device and a third shared device, and communicates with another information processing apparatus which manages a second shared device, comprising:

selection means for selecting symbols of the first shared device and the second shared device using a graphical user interface;

determination means for determining the other information processing apparatus, which manages the second shared device selected by said selection means;

reception means for receiving information of the second shared device selected by said selection means from the other information processing apparatus determined by said determination means, the received information including information of the second shared device comprising an updated status and a connected condition;

recognition means for recognizing whether at least one of the first and second shared devices has been updated regarding its status, in accordance with the information received by said reception means;

renewal means for updating the information on the status or a connected condition of the second shared device in accordance with a recognition result made by said recognition means; and display means for displaying the information on the status or the connected condition of the first shared device and the second shared device updated by said renewal means and information of the third shared device on a same screen of said display means, wherein the displayed information on the first shared device is updated and the information on the third shared device, which is managed by said information processing apparatus but not selected by said selection means, is not updated.

2. An information processing apparatus which manages a first shared device and a third shared device, and communicates with another information processing apparatus which manages a second shared device according to claim 1, wherein said reception means includes first reception control means for designating a shared device satisfying a predetermined condition and receiving the information of the shared device.

3. An information processing apparatus which manages a first shared device and a third shared device, and communicates with another information processing apparatus which manages a second shared device according to claim 1, wherein said reception means includes second reception control means for detecting a log-on operation of another information processing apparatus to the network system and receiving the information of the shared devices managed by the other information processing apparatus.

4. An information processing apparatus which manages a first shared device and a third shared device, and communicates with another information processing apparatus which manages a second shared device according to claim 1, wherein said reception means is adapted, at a log-on operation to the network system, to automatically receive the information of the plurality of shared devices present on the network system.

5. An information processing apparatus which manages a first shared device and a third shared device, and communicates with another information processing apparatus which manages a second shared device according to claim 1, wherein said renewal means is adapted, in response to the detection of a log-off operation of another information processing apparatus from the network system, to invalidate the information of the shared devices managed by the other information processing apparatus.

6. An information processing method of an information processing apparatus which manages a first shared device and a third shared device, and communicates with another information processing apparatus which manages a second shared device, comprising:

a selection step, of selecting symbols of the first shared device and the second shared device using a graphical user interface;

a determination step, of determining the other information processing apparatus, which manages the second shared device selected in said selection step;

a reception step, of receiving information of the second shared device selected in said selection step from the other information processing apparatus determined in said determination step, the received information including information of the second shared device including an updated status and a connected condition;

a recognition step, of recognizing whether at least one of the first and second shared devices has been updated regarding its status, in accordance with the information received in said reception step;

a renewal step, of updating the information on the status or a connected condition of the second shared device in accordance with a recognition result made in said recognition step; and a display step, of displaying on display means the information on the status or the connected condition of the first shared device and the second shared device updated in said renewal step and information of the third shared device on a same screen of the display means, wherein the displayed information on the first shared device is updated and the information on the third shared device, which is managed by the information processing apparatus but not selected in said selection step, is not updated.

7. An information processing method according to claim 6, wherein said reception step includes a first reception control step of designating a shared device satisfying a predetermined condition and receiving the information of the shared device.

8. An information processing method according to claim 6, wherein said reception step includes a second reception control step of detecting a log-on operation of another information processing apparatus to the network system and receiving the information of the shared devices managed by the other information processing apparatus.

9. An information processing method according to claim 6, wherein said reception step includes, at a log-on operation to the network system, automatically receiving the information of the plurality of shared devices present on the network system.

10. An information processing method according to claim 6, wherein said renewal step includes, in response to the detection of a log-off operation of another information processing apparatus from the network system, invalidating the information of the shared devices managed by the other information processing apparatus.

11. A computer readable memory which stores a program to be executed by a computer of an information processing apparatus which manages a first shared device and a third shared device, and communicates with another information processing apparatus which manages a second shared device, comprising:

code for a selection step, of selecting symbols of the first shared device and the second shared device using graphical user interface;

code for a determination step, of determining the other information processing apparatus, which manages the second shared device selected by said code for said selection step;

code for a reception step, of receiving information of the second shared device selected by said code for the selection step from the other information processing apparatus determined by said code for said determination step, the received information including information of the second shared device including an updated status and a connected condition;

code for a recognition step, of recognizing whether at least one of the first and second shared devices has been updated regarding its status, in accordance with the information received by said code for the reception step;

code for a renewal step, of updating the information on the status or a connected condition of the second shared device in accordance with a recognition result made by said code for the recognition step; and code for a display step, of displaying on display means the information on the status or connected condition of the first shared device and the second shared device updated by said code for the renewal step and information of the third shared device on a same screen of the display means, wherein the displayed information on the first shared device is updated and the information on the third shared device, which is managed by the information processing apparatus but not selected by said code for said selection step, is not updated.

12. A computer readable memory according to claim 11, wherein said code for the reception step includes code for a first reception control step of designating a shared device satisfying a predetermined condition and receiving the information of the shared device.

13. A computer readable memory according to claim 11, wherein said code for the reception step includes code for a second reception control step of detecting a log-on operation of another information processing apparatus to the network system and receiving the information of the shared devices managed by the other information processing apparatus.

14. A computer readable memory according to claim 11, wherein said code for the reception step includes, at a log-on operation to the network system, code for automatically receiving the information of the plurality of shared devices present in the network system.

15. A computer readable memory according to claim 11, wherein said code for the renewal step includes, in response to the detection of log-off of another information processing apparatus from the network system, code for invalidating the information of the shared of devices managed by the other information processing apparatus.

16. An information processing apparatus which manages a first shared device and a third shared device, and communicates with another information processing apparatus which manages a second shared device, comprising:

selection means for selecting symbols of the first shared device and the second shared device using a graphical user interface;

determination means for determining the other information processing apparatus, which manages the second shared device selected by said selection means;

obtaining means for obtaining information on a status or a connected condition of the second shared device selected by said selection means from the other information processing apparatus determined by said determination means;

recognition means for recognizing whether at least one of the first and second shared devices has been updated regarding its status or connected condition, in accordance with the information obtained by said obtaining means; and display means for displaying, on a display of said information processing apparatus, the information on the status or the connected condition of the second shared device, in accordance with a recognition result made by said recognition means, and information on a status or a connected condition of the first shared device, and information of the third shared device, wherein the displayed information on the first shared device is updated and the information on the third shared device, which is managed by said information processing apparatus but not selected by said selection means, is not updated.

17. An apparatus according to claim 16, wherein said display means displays on the display of the information processing apparatus information on the status or the connected condition by icon changes.

18. An information processing method of an information processing apparatus which manages a first shared device and a third shared device, and communicates with another information processing apparatus which manages a second shared device comprising:

a selection step, of selecting symbols of the first shared device and the second shared device using a graphical user interface;

a determination step, of determining the other information processing apparatus, which manages the second shared device selected in said selection step;

an obtaining step, of obtaining information on a status or a connected condition of the shared device selected in said selection step from the other information processing apparatus determined in said determination step;

a recognition step, of recognizing whether at least one of the first and second shared devices has been updated regarding its status or connected condition, in accordance with the information obtained in said obtaining step; and a display step, of displaying, on a display of the information processing apparatus, the information on the status or the connected condition of the second shared device, and information on a status or a connected condition of the first shared device, and information of the third shared device, wherein the displayed information on the first shared device is updated and the information on the third shared device, which is managed by the information processing apparatus but not selected in said selection step, is not updated.

19. A method according to claim 18, in which said display step includes displaying on the display of the information processing apparatus information on the status or the connected condition by icon changes.

20. A computer readable memory which stores a program to be executed by a computer of an information processing apparatus which manages a first shared and a third shared device, and communicates with another information processing apparatus which manages a second shared device, comprising:

code for a selection step, of selecting symbols of the first shared device and the second shared device using a graphical user interface;

code for a determination step, of determining the other information processing apparatus, which manages the second shared device selected by said code for said selection step;

code for an obtaining step, of obtaining information on a status or a connected condition of the second shared device selected by said code for the selection step from the other information processing apparatus determined by said code for said determination step;

code for a recognition step, of recognizing whether at least one of the first and second devices has been updated regarding its status or connected condition, in accordance with the information obtained by said code for the obtaining step; and a display step, of displaying, on a display of the information processing apparatus, the information on the status or the connected condition of a second shared device, in accordance with a recognition result made by said code for the recognition step, and information on a status or a connected condition of the first shared device, and information of the third shared device, wherein the displayed information on the first shared device is updated and the information on the third shared device, which is managed by the information processing apparatus but not selected by said code for said selection step, is not updated.

21. A computer readable memory according to claim 20, in which said display step includes displaying information on the status or the connected condition by icon changes.

22. An information processing apparatus that manages a first device and a third device, and communicates with another information processing apparatus that manages a second device, comprising:
   designation means for designating the first device and the second device using a graphical user interface;
   determination means for determining the other information processing apparatus, which manages the second device designated by said designation means;
   obtaining means for obtaining first device information on the first device from the first device, and second device information on the second device designated by said designation means from the other information processing apparatus determined by said determination means; and
   display means for displaying a status or a connected condition of the first and second devices based on the first device information and the second device information obtained by said obtaining means, and information of the third device,
   wherein the displayed information on the first device is updated and the information on the third device, which is managed by said information processing apparatus but not designated by said designation means, is not updated.

23. An apparatus according to claim 22, further comprising:
   storage means for storing the first and second device information obtained by said obtaining means; and
   specifying means for, when said designation means designates the second device, specifying the first and second device information from among a plurality of pieces of device information stored in said storage means,
   wherein said display means displays the status or the connected condition of the first and second devices based on the first device information and the second device information specified by said specifying means.

24. An information processing method of an information processing apparatus that manages a first device and a third device, and communicates with another information processing apparatus that manages a second device, comprising:
   a designation step, of designating the first device and the second device using a graphical user interface;
   a determination step, of determining the other information processing apparatus, which manages the second device designated in said designation step;
   an obtaining step, of obtaining first device information on the first device from the first device, and second device information on the second device designated in said designation step from the other information processing apparatus determined in said determination step; and
   a display step, of displaying a status or a connected condition of the first and second devices based on the first device information and the second device information obtained in said obtaining step, and information of the third device,
   wherein the displayed information on the first device is updated and the information on the third device, which is managed by the information processing apparatus but not designated in said designation step, is not updated.

25. A method according to claim 24, further comprising:
   a storage step, of storing the first and second device information obtained in said obtaining step; and
   a specifying step, of, when said designation step designates the second device, specifying the first and second device information from among a plurality of pieces of device information stored in said storage step,
   wherein said display step displays the status or the connected condition of the first and second devices based on the first device information and the second device information specified in said specifying step.

26. A computer readable memory which stores a program to be executed by a computer of an information processing apparatus that manages a first device and a third device, and communicates with another information processing apparatus that manages a second device, comprising:
   code for a designation step, of designating the first device and the second device second device using a graphical user interface;
   code for a determination step, of determining the other information processing apparatus, which manages the second device designated by said code for said designation step;
   code for an obtaining step, of obtaining first device information on the first device from the first device, and second device information on the second device designated by said code for the designation step from the other information processing apparatus determined by said code for said determination step; and
   code for a display step, of displaying a status or a connected condition of the first and second devices based on the first device information and the second device information obtained by said code for the obtaining step, and information of the third device,
   wherein the displayed information on the first device is updated and the information on the third device, which is managed by the information processing apparatus but not designated by said code for said designation step, is not updated.

27. A computer readable memory according to claim 26, further comprising:
   code for a storage step, of storing the first and second device information obtained by said code for the obtaining step; and
   code for a specifying step, of, when said code for the designation step designates the second device, specifying the first and second device information from among a plurality of pieces of device information stored by said code for the storage step,
   wherein said code for the display step displays the status or the connected condition of the first and second devices based on the first device information and the second device information specified by said code for the specifying step.

* * * * *

UNITED STATES PATENT AND TRADEMARK OFFICE
CERTIFICATE OF CORRECTION

PATENT NO. : 7,313,612 B1
APPLICATION NO. : 09/678893
DATED : December 25, 2007
INVENTOR(S) : Atsushi Kakimoto It is certified that error appears in the above-identified patent and that said Letters Patent is hereby corrected as shown below:

ON COVER PAGE AT (56) FOREIGN PATENT DOCUMENTS

"62211762   A" should read --62-211762 A--.

COLUMN 1

Line 13, "example" should read --example,--;
Line 17, "resources)" should read --resources),--; and
Line 25, "specifically" should read --specifically,--.

COLUMN 2

Line 37, "update," should read --updated,--.

COLUMN 3

Line 28, "an" should read --a--;
Line 44, "applicable for example" should read --applicable, for example,--; and
Line 58, "drive" should read --drive,--.

COLUMN 4

Line 28, "example" should read --example,--; and
Line 60, "stores for example" should read --stores, for example,--.

COLUMN 5

Line 16, "process for example" should read --process, for example,--.

COLUMN 6

Line 52, "resources" should read --resources,--.

COLUMN 7

Line 52, "example" should read --example,--.

UNITED STATES PATENT AND TRADEMARK OFFICE
CERTIFICATE OF CORRECTION

| | |
|---|---|
| PATENT NO. | : 7,313,612 B1 |
| APPLICATION NO. | : 09/678893 |
| DATED | : December 25, 2007 |
| INVENTOR(S) | : Atsushi Kakimoto |

It is certified that error appears in the above-identified patent and that said Letters Patent is hereby corrected as shown below:

COLUMN 8

Line 36, "resources," should read --resource,--;
Line 46, "example" should read --example,--; and
Line 56, "there" should read --it--.

COLUMN 12

Line 26, "Id" should read --If--; and
Line 47, "(for example" should read --(for example,--.

COLUMN 15

Line 45, "7 and" should read --7, and--.

COLUMN 16

Line 16, "are" should read --is--; and
Line 56, "are" should read --is--.

COLUMN 17

Line 35, "acquired for example" should read --acquired, for example,--.

COLUMN 18

Line 16, "not" should read --not to--.

COLUMN 19

Line 1, "1440" should read --step S1440--.

COLUMN 20

Line 50, "efficiency checking" should read --efficiently checking the--.

UNITED STATES PATENT AND TRADEMARK OFFICE
CERTIFICATE OF CORRECTION

PATENT NO. : 7,313,612 B1
APPLICATION NO. : 09/678893
DATED : December 25, 2007
INVENTOR(S) : Atsushi Kakimoto It is certified that error appears in the above-identified patent and that said Letters Patent is hereby corrected as shown below:

COLUMN 21

Line 3, "following" should read --following,--;
Line 52, "magnetooptical" should read --magneto-optical--; and
Line 60, "codes" should read --codes,--.

COLUMN 22

Line 7, "means" should read --means,--;
Line 8, "manner regardless" should read --manner, regardless of--; and
Line 18, "example" should read --example,--.

COLUMN 25

Line 24, "shared of" should read --shared--.

Signed and Sealed this

Twenty-fourth Day of February, 2009

JOHN DOLL
*Acting Director of the United States Patent and Trademark Office*